(12) United States Patent
Kasai et al.

(10) Patent No.: US 9,976,467 B2
(45) Date of Patent: May 22, 2018

(54) EXHAUST SYSTEM

(71) Applicant: NGK INSULATORS, LTD., Nagoya (JP)

(72) Inventors: Yoshiyuki Kasai, Nagoya (JP); Yukio Miyairi, Nagoya (JP); Shinichi Miwa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 33 days.

(21) Appl. No.: 15/299,834

(22) Filed: Oct. 21, 2016

(65) Prior Publication Data

US 2017/0130632 A1 May 11, 2017

(30) Foreign Application Priority Data

Nov. 9, 2015 (JP) ................. 2015-219962

(51) Int. Cl.
*F01N 5/02* (2006.01)
*F02M 26/15* (2016.01)
*F01N 3/10* (2006.01)
*F01N 3/02* (2006.01)
*F01N 13/00* (2010.01)
*F02M 26/22* (2016.01)

(52) U.S. Cl.
CPC ............. *F01N 5/02* (2013.01); *F01N 3/0205* (2013.01); *F01N 3/101* (2013.01); *F01N 13/0093* (2014.06); *F02M 26/15* (2016.02); *F02M 26/22* (2016.02); *F01N 2240/02* (2013.01); *F01N 2240/16* (2013.01); *Y02T 10/16* (2013.01); *Y02T 10/22* (2013.01)

(58) Field of Classification Search
CPC ...... F01N 3/0234; F01N 3/027; F01N 3/2013; F01N 5/00; F01N 5/02; F02G 2243/54
See application file for complete search history.

(56) References Cited

U.S. PATENT DOCUMENTS 3,534,547 A * 10/1970 Mebes ................. B01D 53/944
204/157.3
5,063,029 A 11/1991 Mizuno et al.
(Continued)

FOREIGN PATENT DOCUMENTS

| JP | 2931362 B2 | 8/1999 |
| JP | 2012193685 A * | 10/2012 |
| JP | 2016003643 A * | 1/2016 |

*Primary Examiner* — Jonathan Matthias
(74) *Attorney, Agent, or Firm* — Burr & Brown, PLLC

(57) ABSTRACT

An exhaust system includes: an exhaust pipe defining an exhaust path of exhaust gas to atmosphere; a recirculation pipe defining a recirculation path separating a part of exhaust gas passing through the exhaust pipe and allowing the part to flow back to a power unit; a purification unit purifying exhaust gas by catalyst; and a heating device heating exhaust gas before purification to activate the purification ability of the catalyst. The heating device includes: an acoustic-wave generator generating acoustic waves by absorbing heat from exhaust gas passing through the recirculation pipe and by giving the heat to working fluid to cause the working fluid to oscillate, and a heat transfer part transferring heat of exhaust gas in the exhaust pipe passing through a downstream position from the purification unit to exhaust gas in the exhaust pipe passing through an upstream position from the purification unit by using acoustic waves.

10 Claims, 6 Drawing Sheets

(56) References Cited

U.S. PATENT DOCUMENTS

| | | |
|---|---|---|
| 5,288,975 A | 2/1994 | Kondo |
| RE35,134 E | 12/1995 | Mizuno et al. |
| 6,571,552 B2 * | 6/2003 | Ban .......................... F02G 5/02 60/312 |
| 2016/0177802 A1 * | 6/2016 | Courtes ..................... F01N 5/02 60/320 |

* cited by examiner

EXHAUST SYSTEM

The present application is an application based on JP 2015-219962 filed on Nov. 9, 2015 with Japan Patent Office, the entire contents of which are incorporated herein by reference.

BACKGROUND OF THE INVENTION

Field of the Invention

The present invention relates to an exhaust system connected to a power unit that burns fuel to generate power while generating exhaust gas.

Description of the Related Art

Along with a recent rise in the awareness of environmental issues by the society as a whole, various techniques have been developed in the technical field (e.g., automobile engines) of generating power by burning fuel so as to remove harmful components such as nitrogen oxides from exhaust gas that is generated during burning of the fuel. Such removal of harmful components from exhaust gas is typically performed through a chemical reaction (e.g., reduction or oxidation) of the harmful components caused by catalyst so as to convert the harmful components into a relatively not-harmful other components. Many of such catalyst have a property of activating its removal function for the harmful components by being heated. It is the simplest way to use, as a heat source to heat the catalyst, exhaust gas flowing toward the catalyst for the removal treatment.

Meanwhile the latest power units have improved power generation efficiency (power energy generated from a unit of fuel) because of the influences of increasing demands for saving of energy (e.g., saving resources), and so the amount of heat of exhaust gas generated from a unit of fuel in such power units tends to decrease. This requires some method to heat the exhaust gas flowing toward the catalyst so as to keep the exhaust gas at high temperatures and accordingly keep the active state of the catalyst.

One of the methods of increasing the temperature of exhaust gas may be of simply increasing the amount of fuel per one cycle used to generate a predetermined amount of power energy through the burning of the fuel, so as to increase the amount of heat generated in addition to the power energy. This method, however, basically requires continuing the increased state of fuel per one cycle so as to keep the active state of catalyst. Since this adversely affects the power generation efficiency greatly, this method is not practical. As another method to keep exhaust gas at high temperatures, it is proposed that exhaust gas flowing toward catalyst for a removal treatment is heated by a heater including a honeycomb structure with electrode (see Patent Document 1, for example).

[Patent Document 1] JP-B-2931362

SUMMARY OF THE INVENTION

In general the method of Patent Document 1 uses a part of combustion energy of fuel (e.g., a part of electricity generated from a battery using the produced power) as electricity supplied to the heater, and therefore the power generation efficiency will deteriorate inevitably. If a power source is provided separately, additional electricity is required. In this way, the method of Patent Document 1 cannot respond to the demands for saving of energy in any case. Thus, further improvements are desired to achieve the techniques suitable for both of keeping the active state of catalyst and saving energy.

In view of such circumstances, the present invention aims to provide an exhaust system capable of keeping the active state of catalyst and saving energy.

To solve the above problems, the present invention provides the following exhaust system.

[1] An exhaust system connected to a power unit that burns fuel to generate power while generating exhaust gas, the exhaust system including: an exhaust pipe that is connected to the power unit and defines an exhaust path of exhaust gas generated by the power unit to atmosphere; a recirculation pipe that is connected to the exhaust pipe on the exhaust path and defines a recirculation path which separates a part of exhaust gas passing through the exhaust pipe and allows the part to flow back to the power unit as a part of intake gas for burning; a purification unit that is disposed on the exhaust path and purifies exhaust gas, which flows into the purification unit through the exhaust pipe without flowing into the recirculation pipe, by using catalyst whose exhaust-gas purification ability is activated by being heated; and a heating device that heats exhaust gas before flowing into the purification unit to heat the catalyst in the purification unit and activate exhaust-gas purification ability of the catalyst, wherein the heating device includes: an acoustic-wave generator that is coupled to the recirculation pipe and generates acoustic waves by absorbing heat from exhaust gas passing through the recirculation pipe flowing back and by giving the heat to working fluid, which oscillates to transmit acoustic waves, to cause the working fluid to oscillate, a transmission pipe that is connected to the acoustic-wave generator and transmits acoustic waves, which is generated by the acoustic-wave generator, by oscillation of the working fluid, and a heat transfer part that is connected to the transmission pipe and coupled to the exhaust pipe at both of an upstream position on the exhaust path upstream from the purification unit in the exhausting direction and at a downstream position downstream from the purification unit in the exhausting direction, the heat transfer part transferring heat of exhaust gas in the exhaust pipe passing through the downstream position to exhaust gas in the exhaust pipe passing through the upstream position by using acoustic waves transmitted by the transmission pipe.

[2] The exhaust system according to [1], wherein the acoustic-wave generator includes: a first heat/acoustic wave conversion component that has a partition wall defining a plurality of cells which extend between two end faces of the first heat/acoustic wave conversion component and which are internally filled with working fluid oscillating to transmit acoustic waves, the first heat/acoustic wave conversion component mutually converting heat exchanged between the partition wall and the working fluid and acoustic-wave energy resulting from oscillations of the working fluid; and a high-temperature side heat exchanger that is coupled to the recirculation pipe and disposed close to one end face of the two end faces of the first heat/acoustic wave conversion component, the high-temperature side heat exchanger absorbing heat from exhaust gas flowing through the recirculation pipe and supply the heat to the one end face of the first heat/acoustic wave conversion component, and a low-temperature side heat exchanger that is disposed close to the other end face of the first heat/acoustic wave conversion component, the low-temperature side heat exchanger absorbing heat from the other end face of the first heat/acoustic wave conversion component and passing the heat to a predetermined cooling medium, wherein the transmission pipe has one end thereof connected to the low-temperature side heat exchanger and transmits acoustic waves, which is generated by the first heat/acoustic wave conversion component due to a temperature difference between the two end faces of the first heat/acoustic wave conversion component, from the one end of the transmission pipe to the other end of the transmission pipe, and wherein the heat transfer part includes: a second heat/acoustic wave conversion component that has a partition wall defining a plurality of cells which extend between two end faces of the second heat/acoustic wave conversion component and which are internally filled with working fluid oscillating to transmit acoustic waves, the second heat/acoustic wave conversion component mutually converting heat exchanged between the partition wall and the working fluid and acoustic-wave energy resulting from oscillations of the working fluid; a downstream side heat exchanger that is connected to the other end of the transmission pipe, that is disposed close to one end face of the two end faces of the second heat/acoustic wave conversion component, and that is coupled to the exhaust pipe at the downstream position from the purification unit, the downstream side heat exchanger absorbing heat from the exhaust gas in the exhaust pipe passing through the downstream position and supplying the heat to the one end face of the second heat/acoustic wave conversion component; and an upstream side heat exchanger disposed close to the other end face of the second heat/acoustic wave conversion component and coupled to the exhaust pipe at the upstream position from the purification unit, the upstream side heat exchanger absorbing heat from the other end face of the second heat/acoustic wave conversion component and supplying the heat to exhaust gas in the exhaust pipe passing through the upstream position.

[3] The exhaust system according to [2], wherein at least one of the first heat/acoustic wave conversion component and the second heat/acoustic wave conversion component includes a honeycomb structure made of cordierite.

[4] The exhaust system according to [2] or [3], wherein the power unit is a diesel engine that burns light oil to generate power while generating exhaust gas including nitrogen oxides, the exhaust system further includes a urea injection device that injects urea to exhaust gas before flowing into the purification unit, the purification unit includes an SCR catalyst converter that reduces nitrogen oxides into water and nitrogen by using ammonia generated through hydrolysis of urea injected by the urea injection device and Selective Catalytic Reduction (SCR) catalyst, and the upstream side heat exchanger supplies heat to exhaust gas at a position, as the upstream position, upstream in the exhausting direction from a position at which the urea injection device injects urea.

[5] The exhaust system according to [2] or [3], wherein the power unit is a gasoline engine that burns gasoline to generate power while generating exhaust gas including nitrogen oxides, hydrocarbons and carbon monoxide, and the purification unit includes a three-way catalyst unit that removes nitrogen oxides, hydrocarbons and carbon monoxide by three-way catalyst.

[6] The exhaust system according to any one of [1] to [5], wherein the transmission pipe includes a first pipe that transmits acoustic waves generated at the acoustic-wave generator to the heat transfer part as well as a second part that transmits acoustic waves which has passed through the heat transfer part to the acoustic-wave generator.

In the exhaust system of the present invention, acoustic waves are generated based on heat of the recirculation pipe, and by using the acoustic waves, heat of exhaust gas downstream from the purification unit in the exhausting direction is transmitted to the exhaust gas upstream from the purification unit in the exhausting direction. Such heat transmission heats the exhaust gas upstream in the exhausting direction. In this way, the exhaust system of the present invention uses heat of the exhaust gas in the recirculation pipe as the energy source and heats catalyst by pumping heat of the exhaust gas from the downstream-side of the purification unit to the upstream side thereof by a so-called thermoacoustic effect, whereby the activation state of the catalyst can be kept while saving energy.

DESCRIPTION OF THE PREFERRED EMBODIMENTS

Figure 1:
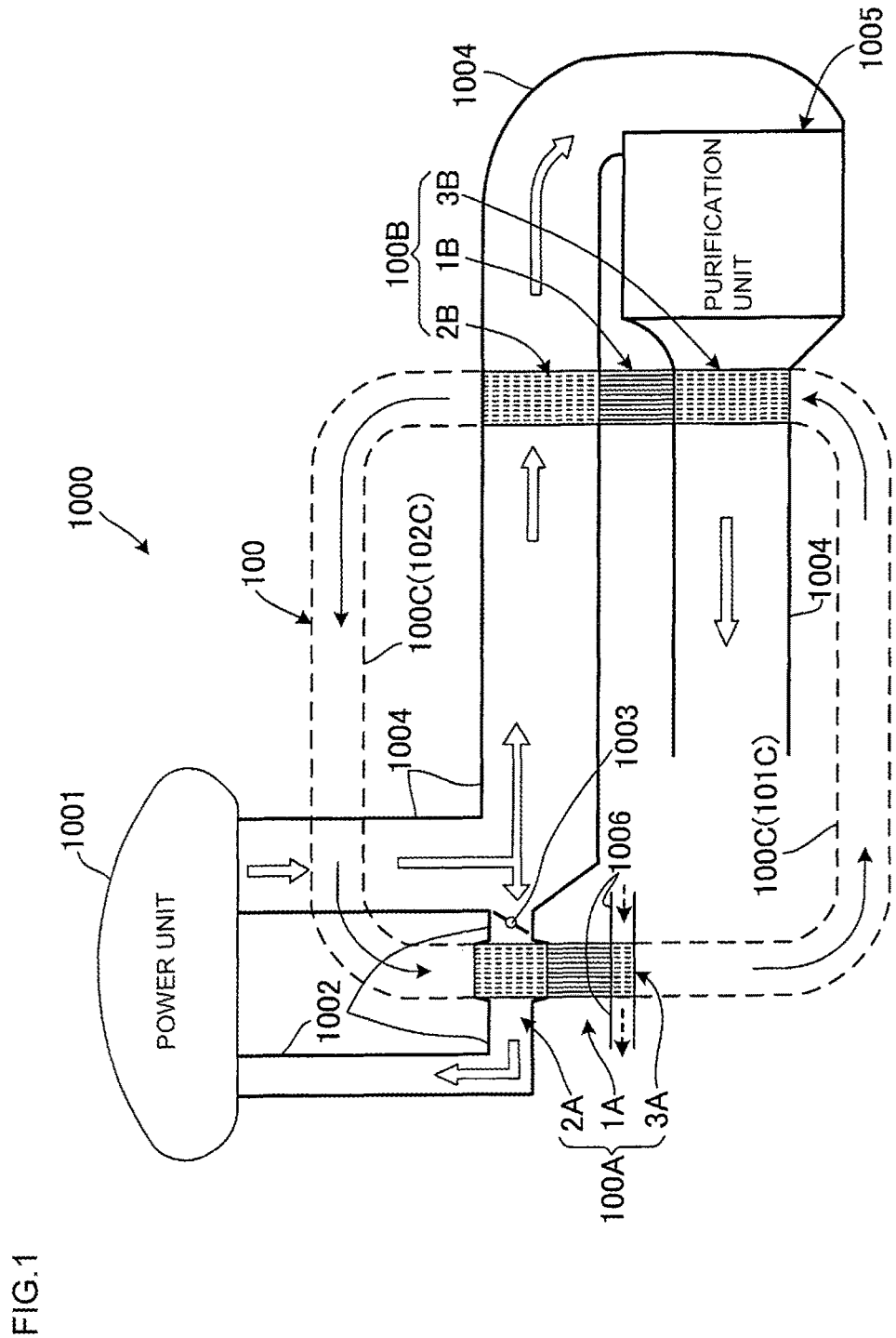
FIG. 1 schematically shows the configuration of one basic embodiment of an exhaust system of the present invention.

Referring now to the drawings, the following describes embodiments of the present invention. The present invention is not limited to the following embodiments. The present invention is to be understood to include the following embodiments, to which modifications and improvements of the design are added as needed based on the ordinary knowledge of a person skilled in the art without departing from the scope of the present invention.

FIG. 1 schematically shows the configuration of one basic embodiment of an exhaust system of the present invention.

An exhaust system 1000 shown in FIG. 1 is connected to a power unit 1001 that burns fuel to generate power while generating exhaust gas. Examples of such power unit 1001 include a light oil-fueled diesel engine and a gasoline-fueled gasoline engine. Examples of the power unit other than these engines include power units fueled by LPG (liquefied petroleum gas), natural gas and ethanol as well as by purified substances and processed substances of these fuels.

Exhaust gas generated from the power unit 1001 during burning of fuel contains environmentally harmful components. Examples of such harmful components include nitrogen oxides that are environmentally harmful. Examples other than nitrogen oxides include carbon monoxide and hydrocarbons, and they are also environmentally harmful chemical substances.

The exhaust system 1000 has a function of removing these harmful components from exhaust gas and then emitting the gas to the atmosphere. The exhaust system 1000 includes an exhaust pipe 1004, a recirculation pipe 1002, a purification unit 1005 and a heating device 100.

The exhaust pipe 1004 is connected to the power unit 1001, and is a pipe to define an exhaust path of exhaust gas generated at the power unit 1001 to the atmosphere.

The recirculation pipe 1002 is connected to the exhaust pipe 1004 on this exhaust path, and is a pipe to define a recirculation path that separates a part of exhaust gas passing through the exhaust pipe 1004 and allows the part to flow back to the power unit 1001 as a part of intake gas for burning. Herein, the amount of exhaust gas flowing back to the power unit 1001 out of the entire exhaust gas emitted from the power unit 1001 is regulated by a valve 1003. FIG. 1 shows, with bold arrows, both of the flow of exhaust gas generated at the power unit 1001 and passing through the exhaust pipe 1004 to be emitted to the atmosphere and the flow of exhaust gas separated from exhaust gas passing through the exhaust pipe 1004 and flowing back to the power unit 1001 through the recirculation pipe 1002 to be a part of the intake gas for burning. The intake gas for burning is oxygen-containing gas, and it typically can contain the air in the atmosphere as its main component. The intake gas in which the part of the exhaust gas is mixed with the air in the atmosphere or the like has a relatively low oxygen density in the intake gas as compared with intake gas containing no exhaust gas at all, and therefore fuel burns gently, so that the rise of the temperature due to burning is relatively low. Further, such mixing of the part of exhaust gas makes the density of carbon dioxide, whose temperature is harder to rise than that of oxygen, relatively higher than that of intake gas containing no exhaust gas containing at all. This is another reason why the rise of the temperature due to burning is relatively low. In general a higher temperature during burning generates nitrogen oxides more, and the exhaust system 1000 can suppress the generation of nitrogen oxides by flowing the part of exhaust gas back to the power unit 1001 as a part of the intake gas. Such a scheme of returning the part of exhaust gas to the power unit 1001 as a part of intake gas to suppress the generation of nitrogen oxides is called Exhaust Gas Recirculation (EGR).

The purification unit 1005 purifies exhaust gas that flows into the purification unit 1005 through the exhaust pipe 1004 without flowing into the recirculation pipe 1002, and the purification unit 1005 is provided on the exhaust path of exhaust gas. The purification unit 1005 has catalyst that activates its exhaust-gas purification ability by being heated, and the purification of exhaust gas is performed with this catalyst. Purification of exhaust gas here refers to removal of harmful components such as nitrogen oxides in the exhaust gas, and harmful components are removed by a chemical reaction (e.g., reduction or oxidization) of the harmful components with the catalyst to convert the harmful components into relatively not-harmful other components. Examples of such catalyst include selective catalytic reduction (SCR) catalyst to promote a reduction reaction of nitrogen oxides using ammonia as reducing agent for purification catalyst of exhaust gas in a diesel engine, for example. Specifically SCR catalyst containing oxides of vanadium, molybdenum, tungsten or the like and zeolite can be exemplified. For purification catalyst of exhaust gas in a gasoline engine, three-way catalyst containing platinum group elements such as platinum, palladium and rhodium can be exemplified. The purification unit 1005 can have a conventionally-known configuration (e.g., see Patent Document 1). For instance, it may be configured so that the aforementioned catalyst is disposed on the inner wall faces of a plurality of cells of a metal or ceramic honeycomb structure.

Although not shown in FIG. 1, a filter device may be disposed on the exhaust path upstream from the purification unit 1005 in the exhausting direction, the filter device removing particulates included in the exhaust gas (e.g., see FIG. 5 described later). The filter device traps particulates physically by adsorption or the like. Although the purification scheme of the filter device is different from that of the purification unit 1005, particulates in the exhaust gas are also environmentally harmful substance and removal of such particulates can further promote the purification of exhaust gas. If the amount of particulates in the exhaust gas is not very much, such a filter device may not be required. Moreover, although not shown in FIG. 1, some purification units each having a purification ability similar to that of the purification unit 1005 may be disposed separately on the exhaust path upstream from the purification unit 1005 in the exhausting direction (e.g., see FIG. 6 described later). In the following description, when such purification units are disposed separately, the temperature of exhaust gas flowing into such purification units is sufficiently high so that the purification ability of such purification units disposed separately can be exerted sufficiently.

The heating device 100 heats exhaust gas before flowing into the purification unit 1005 to heat catalyst included in the purification unit 1005 and to activate the exhaust-gas purification ability of the catalyst. The heating device includes an acoustic-wave generator 100A, a transmission pipe 100C and a heat transfer part 100B.

The acoustic-wave generator 100A generates acoustic waves by absorbing heat from exhaust gas passing through the recirculation pipe 1002 for flowing back and by giving the heat to working fluid having a property of oscillating to transmit acoustic waves, to cause the working fluid to oscillate. The acoustic-wave generator 100A is coupled to the recirculation pipe 1002.

As the working fluid, the one in the form of gas at least at the temperature band around the power unit 1001 can be used. This is because in general gas has low viscosity and high fluidity, and so can exert a sufficient acoustic-wave transmission function. Types of the gas are not limited especially, which may be air in the atmosphere, for example. Note here that reactive gas often generates chemical changes and its function as the acoustic-wave transmission medium easily deteriorates, and therefore gas with low reactivity is preferred. The gas has lower viscosity preferably because such gas can avoid attenuation of acoustic-wave energy due to viscosity. For instance, rare gas is particularly preferable because it has low reactivity especially and has low viscosity.

The transmission pipe 100C is connected to the acoustic-wave generator 100A, and is a pipe to transmit acoustic waves generated at the acoustic-wave generator 100A through the oscillation of working fluid. The transmission pipe 100C is connected to the heat transfer part 100B described later as well, and therefore acoustic waves are transmitted from the acoustic-wave generator 100A to the heat transfer part 100B via the transmission pipe 100C.

FIG. 1 shows the transmission pipe 100C including two parts of a first part 101C at a lower part of the drawing and a second part 102C at an upper part of the drawing that make up a loop-like pipe as a whole. The first part 101C at the lower part of the drawing has the above-mentioned function of the transmission pipe 100C to transmit acoustic waves from the acoustic-wave generator 100A to the heat transfer part 100B, and the second part 102C has a function to transmit acoustic waves, which has passed through the heat transfer part 100B, to the acoustic-wave generator 100A.

The transmission pipe 100C in such a form can use the same working fluid (e.g., a specific type of working fluid) repeatedly as the acoustic-wave transmission medium. The drawing shows the flow of circulating working fluid in this way with solid arrows. Herein, when the ambient air is used as the working fluid, the transmission pipe 100C may be configured with only the first part 101C at the lower part of the drawing and the second part 102C at the upper part of the drawing is not necessarily required since the ambient air taken in the first part 101C can be used as the working fluid as it is.

The heat transfer part 100B is connected to the transmission pipe 100C as stated above, and is further coupled to the exhaust pipe 1004 at both of a position on the exhaust path upstream from the purification unit 1005 in the exhausting direction and at a position downstream from the purification unit 1005 in the exhausting direction. This heat transfer part 100B has a function to transfer heat of the exhaust gas in the exhaust pipe 1004 passing through the downstream position as stated above to the exhaust gas in the exhaust pipe 1004 passing through the upstream position as stated above by using acoustic waves transmitted by the transmission pipe 100C.

As described above, acoustic waves are generated at the acoustic-wave generator 100A of the exhaust system 1000 in FIG. 1 based on the heat of the recirculation pipe 1002. Then the heat transfer part 100B transfers heat of the exhaust gas on the downstream side in the exhausting direction of the purification unit 1005 to the exhaust gas on the upstream side in the exhausting direction of the purification unit using the acoustic waves, to heat the exhaust gas on the upstream side in the exhausting direction. The acoustic-wave generator 100A generates acoustic waves by converting heat into acoustic-wave energy due to a so-called thermoacoustic effect. The heat transfer part 100B transfers heat by reverse conversion thereof (conversion from acoustic-wave energy to heat). In this way, the exhaust system 1000 uses heat of the exhaust gas in the recirculation pipe 1002 as the energy source and heats catalyst by pumping heat of the exhaust gas in the exhaust pipe 1004 from the downstream-side of the purification unit 1005 to the upstream side thereof by a thermoacoustic effect. Unlike exhaust gas in the exhaust pipe 1004 to heat catalyst of the purification unit 1005, exhaust gas in the recirculation pipe 1002 is not required to be at high temperatures, and it is rather preferable that the exhaust gas there is at low temperatures from the viewpoint of lowering the burning temperature of the power unit 1001. The exhaust system 1000 heats catalyst by making use of heat of the exhaust gas in the recirculation pipe 1002 that is less useful, to keep the active state of catalyst while saving energy.

The following describes the acoustic-wave generator 100A and the heat transfer part 100B in FIG. 1 in details while referring to the details of the thermoacoustic effect.

The acoustic-wave generator 100A includes a first heat/acoustic wave conversion component 1A, a high-temperature side heat exchanger 2A and a low-temperature side heat exchanger 3A. The first heat/acoustic wave conversion component 1A includes a plurality of cells (described later) extending between two end faces of the first heat/acoustic wave conversion component 1A, and the plurality of cells are filled with the above-mentioned working fluid and are in communication with the transmission pipe 100C. The high-temperature side heat exchanger 2A and the low-temperature side heat exchanger 3A are disposed close to both end faces of the first heat/acoustic wave conversion component 1A with the first heat/acoustic wave conversion component 1A disposed therebetween. The high-temperature side heat exchanger 2A is coupled to the recirculation pipe 1002, and is a heat exchanger that absorbs heat from exhaust gas flowing through the recirculation pipe 1002 and that supplies the heat to the end face of the first heat/acoustic wave conversion component 1A close to the high-temperature side heat exchanger 2A. The low-temperature side heat exchanger 3A is a heat exchanger that absorbs heat from the end face of the first heat/acoustic wave conversion component 1A close to the low-temperature side heat exchanger 3A and passes the heat to a predetermined cooling medium. As the predetermined cooling medium, liquid or gas flowing through a cooling pipe 1006 coupled to the low-temperature side heat exchanger 3A (see the dashed arrows in the drawing for the flow thereof) as in FIG. 1 can be used, the liquid or the gas being at a relatively lower temperature than the exhaust gas in the recirculation pipe 1002. A specific example of the predetermined cooling medium includes cooling water at ambient temperatures. Air in the atmosphere may be used as the predetermined cooling medium, and in that case, heat is emitted from the end face of the first heat/acoustic wave conversion component 1A close to the low-temperature side heat exchanger 3A to the atmosphere through the low-temperature side heat exchanger 3A. When air in the atmosphere is used, the ability of absorbing heat from the end face of the first heat/acoustic wave conversion component 1A close to the low-temperature side heat exchanger 3A (the ability of cooling this end face) is lower than in the case of using cooling water at ambient temperatures. On the contrary, the case using air in the atmosphere has an advantage of eliminating the cooling pipe 1006 and means to feed cooling water to the cooling pipe 1006.

Due to the actions of the high-temperature side heat exchanger 2A and the low-temperature side heat exchanger 3A as stated above, a temperature difference occurs between both end faces of the first heat/acoustic wave conversion component 1A such that the end face close to the high-temperature side heat exchanger 2A is relatively at a higher temperature than at the end face close to the low-temperature side heat exchanger 3A. Such a temperature difference causes the working fluid in the plurality of cells in the first heat/acoustic wave conversion component 1A to start to oscillate in the extending direction of the cells, and the oscillations are transmitted as acoustic waves to the outside from the first heat/acoustic wave conversion component 1A. Such a phenomenon of the working fluid oscillating in response to a given temperature difference is called self-induced oscillations, and is a conventionally well-known phenomenon that occurs when a temperature gradient is given to a thin tube. A thermoacoustic effect refers to the generation of acoustic waves due to the self-induced oscillations of working fluid resulting from heat. The following briefly describes this self-induced oscillation (a lot of documents describe the details, and JP-A-2012-237295 also provides the detailed descriptions thereon, for example).

In general, when giving a temperature gradient to a thin tube, then working fluid inside of the thin tube on the high-temperature side absorbs heat from the wall surface of the tube and expands from the high-temperature side to the low-temperature side. Then, the working fluid releases heat to the wall surface on the low-temperature side and is compressed, and then returns back to the high-temperature side. Such exchange of heat with the wall surface and expansion/compression are repeated, which results in oscillation of the working fluid in the extending direction of the tube (the direction in which the tube extends). Simply speaking, such motion of the working fluid can be said as the motion of the working fluid to convey heat so as to alleviate (weaken) the temperature gradient at the wall surface. As can be clear from this description as well, such a phenomenon occurs only when the tube is so thin that the thermal effects from the wall surface are large on the working fluid inside. That is, as the tube is made thicker, the thermal effect from the wall surface decreases (i.e., it becomes closer to an adiabatic state), and so such self-induced oscillation hardly occurs. Then, the thickness of the tube is an important factor to generate acoustic waves by the self-induced oscillation, and the thickness of the tube can be evaluated more quantitatively based on a hydraulic diameter HD that is defined as HD=4×S/C, where S denotes the cross-sectional area of the tube and C denotes the perimeter of this section.

Since the plurality of cells in the first heat/acoustic wave conversion component 1A as stated above has a sufficient small hydraulic diameter HD to generate self-induced oscillation, self-induced oscillation occurs due to the temperature difference as stated above at the both end faces of the first heat/acoustic wave conversion component 1A. Due to this self-induced oscillation, acoustic waves are generated, which travel from the end face close to the high-temperature side heat exchanger 2A on the high temperature side to the end face close to the low-temperature side heat exchanger 3A on the low temperature side. The low-temperature side heat exchanger 3A is connected to one end of the first part 101C of the transmission pipe 100C, and so the acoustic waves generated travel through the first part 101C of the transmission pipe 100C toward the heat transfer part 100B.

The heat transfer part 100B includes a second heat/acoustic wave conversion component 1B, an upstream side heat exchanger 2B, and a downstream side heat exchanger 3B. The second heat/acoustic wave conversion component 1B has a configuration similar to that of the first heat/acoustic wave conversion component 1A as stated above (the configuration such that a plurality of cells extend between both end faces). The upstream side heat exchanger 2B and the downstream side heat exchanger 3B are disposed close to both end faces of the second heat/acoustic wave conversion component 1B with the second heat/acoustic wave conversion component 1B disposed therebetween. The downstream side heat exchanger 3B is connected to an end of the first part 101C of the transmission pipe 100C that is on the opposite side of the low-temperature side heat exchanger 3A as stated above, and is further coupled to the exhaust pipe 1004 downstream from the purification unit 1005 in the exhausting direction. The upstream side heat exchanger 2B is coupled to the exhaust pipe 1004 upstream from the purification unit 1005 in the exhausting direction. Except for the coupling targets, the upstream side heat exchanger 2B and the downstream side heat exchanger 3B can have the same configurations as those of the high-temperature side heat exchanger 2A and the low-temperature side heat exchanger 3A, respectively.

When the heat transfer part 100B receives acoustic waves traveled through the first part 101C, a temperature difference occurs between both end faces of the second heat/acoustic wave conversion component 1B due to the mechanism (a temperature gradient is generated from acoustic waves) that is the inverse of the mechanism of the thermoacoustic effect as stated above (acoustic waves are generated from a temperature gradient). Specifically, the end face of the second heat/acoustic wave conversion component 1B close to the upstream side heat exchanger 2B is at a relatively higher temperature than at the end face of the second heat/acoustic wave conversion component 1B close to the downstream side heat exchanger 3B. This temperature difference results from acoustic waves conveying heat from the end face of the second heat/acoustic wave conversion component 1B close to the downstream side heat exchanger 3B to the end face close to the upstream side heat exchanger 2B while traveling through the plurality of cells in the second heat/acoustic wave conversion component 1B. At this time, the downstream side heat exchanger 3B absorbs heat from exhaust gas in the exhaust pipe 1004 passing through a position where the downstream side heat exchanger 3B is coupled to the exhaust pipe 1004 (downstream from the purification unit 1005 in the exhausting direction) and supplies the heat to the end face of the second heat/acoustic wave conversion component 1B close to the downstream side heat exchanger 3B. Meanwhile, the upstream side heat exchanger 2B absorbs heat from the end face of the second heat/acoustic wave conversion component 1B close to the upstream side heat exchanger 2B and supplies the heat to exhaust gas in the exhaust pipe 1004 passing through the position where the upstream side heat exchanger 2B is coupled to the exhaust pipe 1004 (upstream from the purification unit 1005 in the exhausting direction). As a result, the exhaust gas before flowing into the purification unit 1005 is heated.

The following describes the configuration of the acoustic-wave generator 100A and the heat transfer part 100B in more details by way of a specific example. As described above, the acoustic-wave generator 100A and the heat transfer part 100B can have the same configuration except that their coupling targets (the recirculation pipe 1002, the exhaust pipe 1004 and the cooling pipe 1006) for heat exchange are different. Thus, the following describes a specific example of the configuration of the acoustic-wave generator 100A as one example.

Figure 2:
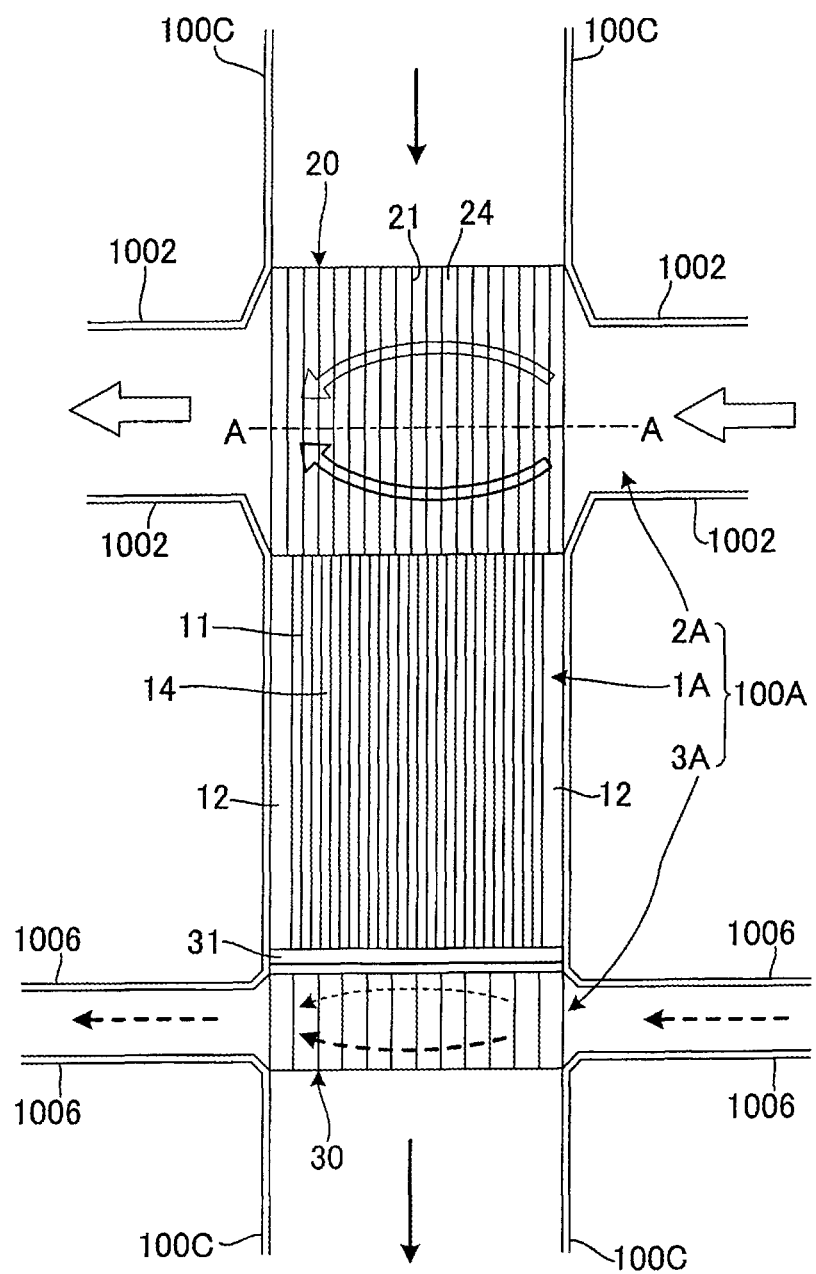
FIG. 2 schematically shows a specific example of the configuration of the acoustic-wave generator in FIG. 1.

FIG. 2 schematically shows a specific example of the configuration of the acoustic-wave generator 100A in FIG. 1.

The following describes a specific example of the configuration of the acoustic-wave generator 100A in FIG. 1, and like reference numerals designate like parts of FIG. 1 for description. Since the heat transfer part 100B of FIG. 1 can have the same configuration as that of the acoustic-wave generator 100A as stated above, the following specific example of the configuration of the acoustic-wave generator 100A can be a specific example of the configuration of the heat transfer part 100B as well.

As described above referring to FIG. 1, the acoustic-wave generator 100A in FIG. 2 includes the first heat/acoustic wave conversion component 1A, the high-temperature side heat exchanger 2A and the low-temperature side heat exchanger 3A, and further includes a metal member 31 and an interference member 12.

The first heat/acoustic wave conversion component 1A in FIG. 2 is a honeycomb structure, in which a plurality of cells 14 are defined by a partition wall 11, and each of the plurality of cells is a through hole like a thin tube. Herein, the word "cell" in the present specification refers to a through hole only that does not include the partition wall. Each cell 14 extends in the vertical direction (up and down) of FIG. 2, and the following refers to a direction in which the cells 14 extend as the extending direction of the cells 14. Each cell 14 is open at both end faces that are the end face close to the low-temperature side heat exchanger 3A and the end face close to the high-temperature side heat exchanger 2A. The end face of the first heat/acoustic wave conversion component 1A close to the low-temperature side heat exchanger 3A is in contact with the metal member 31, and is opposed to the low-temperature side heat exchanger 3A with the metal member 31 disposed therebetween. Note here that since the metal member 31 plays a role for heat conduction as described later, the metal member 31 is preferably made of a material having large heat conductivity, which may be made of e.g., copper. The present invention may have a form of omitting the metal member 31, and in this case, a gap between the first heat/acoustic wave conversion component 1A and the low-temperature side heat exchanger 3A is as small as possible preferably.

The metal member 31 is a member made of metal having a plate shape, at a center part of which a plurality of parallel slits (not illustrated) are formed, and FIG. 2 illustrates a side-face part (thickness part) of the plate shape only.

The low-temperature side heat exchanger 3A of FIG. 2 includes a mesh lamination body 30 including the lamination of a plurality of metal mesh plates (e.g., made of copper). Cooling medium flows into the low-temperature side heat exchanger 3A from the cooling pipe 1006 coupled to the low-temperature side heat exchanger 3A, and flows so as to surround the mesh lamination body 30 (see dashed arrows in FIG. 2). Heat transmitted to the mesh lamination body 30 from the end face of the first heat/acoustic wave conversion component 1A close to the low-temperature side heat exchanger 3A via the metal member 31 is transmitted to this cooling medium, and then the heat is conveyed by this cooling medium. As a result, the end face of the first heat/acoustic wave conversion component 1A close to the low-temperature side heat exchanger 3A is kept at a low temperature. The mechanism of such exchanging heat between the low-temperature side heat exchanger 3A and the cooling medium in the cooling pipe 1006 is the same as the mechanism of exchanging heat between the high-temperature side heat exchanger 2A and exhaust gas in the recirculation pipe 1002 described later (see FIG. 3 described later) except that their heat exchanging directions are opposite.

The side face of the first heat/acoustic wave conversion component 1A of FIG. 2 is surrounded by the interference member 12, and FIG. 2 schematically shows the cross section of the surrounding interference member 12 as two parts of the interference member 12 that sandwich the first heat/acoustic wave conversion component 1A from both of the left and right sides in the drawing. This interference member 12 has a function as a thermal insulator to avoid heat exchanging between the side face of the first heat/acoustic wave conversion component 1A extending between both end faces of the first heat/acoustic wave conversion component 1A and the surrounding environment outside of the first heat/acoustic wave conversion component 1A.

The high-temperature side heat exchanger 2A of FIG. 2 includes a heat-exchanging honeycomb structure 20. The heat-exchanging honeycomb structure 20 is a pillar-shaped honeycomb structure, and the heat-exchanging honeycomb structure 20 includes two or more cells 24 defined by a partition wall 21, each cell extending in the perpendicular direction (vertical direction) of FIG. 2. These two or more cells 24 are in communication with the transmission pipe 100C and the plurality of cells 14 of the first heat/acoustic wave conversion component 1A, and are filled with working fluid. Herein unlike the first heat/acoustic wave conversion component 1A, each of these two or more cells 24 has a sufficiently large hydraulic diameter, so that self-induced oscillations can be substantially ignored in the heat-exchanging honeycomb structure 20. As shown in FIG. 2, the heat-exchanging honeycomb structure 20 is close to the end face of the first heat/acoustic wave conversion component 1A (end face close to the high-temperature side heat exchanger 2A), and receives heat from exhaust gas flowing through the recirculation pipe 1002 and transfers the heat to this end face (the end face close to the high-temperature side heat exchanger 2A). Such heat transfer can keep the end face of the first heat/acoustic wave conversion component 1A close to the high-temperature side heat exchanger 2A at a high temperature (the state having a temperature higher than the temperature at the end face close to the low-temperature side heat exchanger 3A).

From the aspect of such a function of heat transfer, the heat-exchanging honeycomb structure 20 is preferably made of a material having a large heat conductivity, which may be a metal material, e.g., copper. Alternatively, instead of such a member having a honeycomb structure, a member having the configuration of a mesh lamination body including the lamination of a plurality of metal (e.g., copper) mesh plates may be used. Herein, from the aspect of preventing such a metal heat-exchanging honeycomb structure 20 (or mesh lamination body) from altering in quality due to reaction with working fluid under high temperature, the working fluid used in this case preferably is less reactive with metals, such as rare gas. Moreover, a ceramic material containing SiC (silicon carbide), which has a relatively large heat conductivity even under a high-temperature condition as the operation environment, as a main component may be used for the heat-exchanging honeycomb structure 20 (or mesh lamination body). The "main component" here means that the component accounts for 50 mass % or more of the all materials constituting the heat-exchanging honeycomb structure 20. Although SiC (silicon carbide) is not metal, but has relatively large heat conductivity among ceramic materials having high-temperature endurance, and is relatively less reactive as compared with typical metal materials (iron, copper and the like). Specific examples of the ceramic material containing SiC as a main component include simple SiC as well as Si impregnated SiC, (Si+Al) impregnated SiC, metal composite SiC, recrystallized SiC, $Si_3N_4$ and SiC. Among them, Si impregnated SiC and (Si+Al) impregnated SiC are preferable. This is because Si impregnated SiC has good heat conductivity and heat resistance, and has low porosity although it is a porous body and so is formed densely, and then it can realize relatively high strength as compared with SiC without impregnated Si.

Since the heat-exchanging honeycomb structure 20 is connected to the transmission pipe 100C, the heat-exchanging honeycomb structure 20 has a function as a traveling path of acoustic waves, in addition to heat transfer as stated above. That is, after passing through the heat transfer part 100B of FIG. 1 and travelling along the second part 102C (see FIG. 1) of the transmission pipe 100C, acoustic waves will reach the high-temperature side heat exchanger 2A and will travel through two or more cells 24 in the heat-exchanging honeycomb structure 20.

Figure 3:
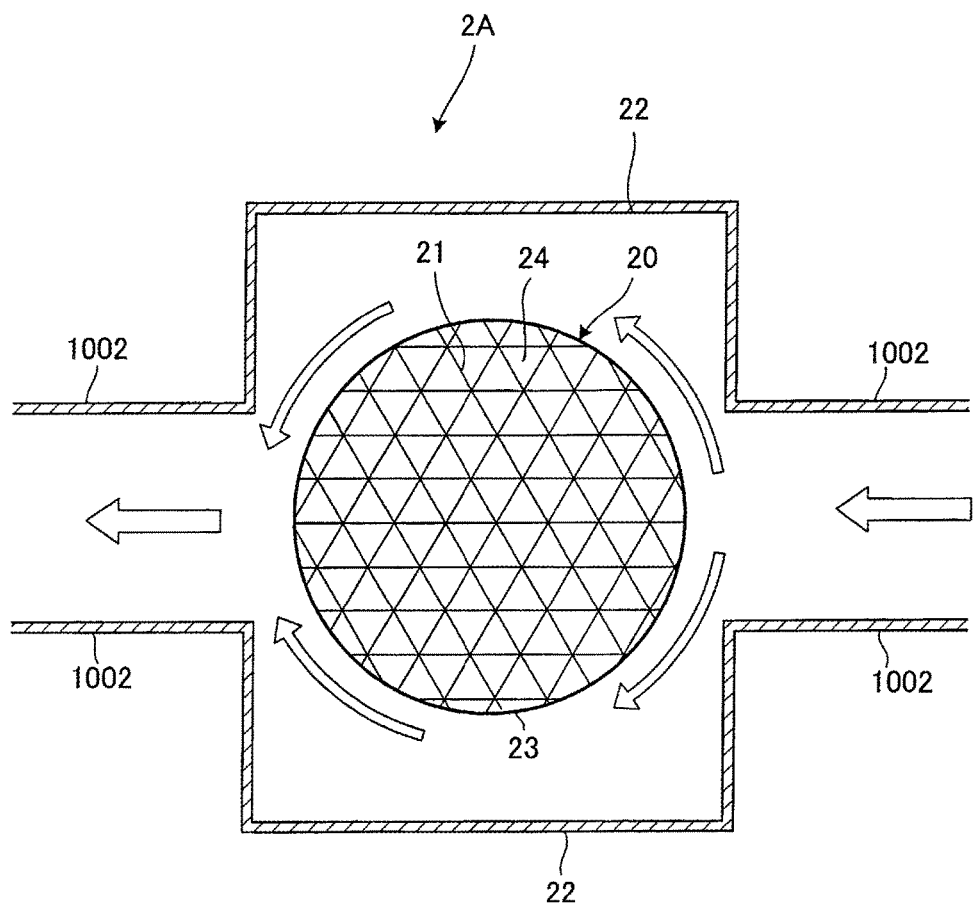
FIG. 3 is a cross-sectional view of the high-temperature side heat exchanger taken along the line A-A of FIG. 2.

FIG. 3 is a cross-sectional view of the high-temperature side heat exchanger 2A taken along the line A-A of FIG. 2.

As shown in FIG. 3, the high-temperature side heat exchanger 2A has a configuration so that the heat-exchanging honeycomb structure 20 is fitted at a center that is surrounded by a heat-exchanger casing 22. In this high-temperature side heat exchanger 2A, exhaust gas flows in from the recirculation pipe 1002 on the right of FIG. 3, and flows out into the recirculation pipe 1002 on the left of FIG. 3. At this time, the inflow exhaust gas directly collides with a circumferential wall 23 defining the circular circumference of the heat-exchanging honeycomb structure 20, and branches off into two directions of up and down of the circumferential wall 23 as indicated with thick arrows around the heat-exchanging honeycomb structure 20 so as to travel along the circumferential wall 23. These two flows of the exhaust gas join together at the point of substantially traveling half around the heat-exchanging honeycomb structure 20 along the upper half and the lower half along the circumference of the heat-exchanging honeycomb structure 20 along the circumferential wall 23. Then it flows out into the recirculation pipe 1002 on the left of FIG. 3. In this way, heating fluid at high temperature travels while directly coming in contact with the circumferential wall 23 of the heat-exchanging honeycomb structure 20, whereby a great deal of heat is transferred from the exhaust gas to the circumferential wall 23, and the heat is transferred to the working fluid inside of the partition wall 21 and the cells 24 in the heat-exchanging honeycomb structure 20 as well. Such transferred heat is supplied to the end face of the first heat/acoustic wave conversion component 1A close to the high-temperature side heat exchanger 2A of FIG. 2.

The above describes the form in which the heat-exchanging honeycomb structure 20 (or the circumferential wall 23 of the heat-exchanging honeycomb structure 20) is directly in contact with exhaust gas, and the present invention may be in the form in which the circumferential wall 23 is surrounded by metal. Such metal added to surround the circumferential wall 23 slightly decreases the amount of heat absorbed by the heat-exchanging honeycomb structure 20 from the exhaust gas, but the heat-exchanging honeycomb structure 20 can be protected firmly. As a result, this can effectively avoid breakage of the heat-exchanging honeycomb structure 20 or leakage of working fluid inside of the heat-exchanging honeycomb structure 20 to the outside, and mixing of such working fluid with exhaust gas.

The specific example shown in FIG. 3 describes a so-called crossflow type heat exchanger in which heat is exchanged while crossing the channel of the exhaust gas in the recirculation pipe 1002 and the channel of the working fluid in the heat-exchanging honeycomb structure 20. In the present invention, heat may be exchanged using a so-called counterflow type heat exchanger instead of such a crossflow type heat exchanger, the counterflow type heat exchanger being configured so that the channel of exhaust gas and the channel of working fluid in the heat-exchanging honeycomb structure 20 are parallel to each other in the heat exchanger. In general, a crossflow type heat exchanger can be easily assembled into an exhaust system as compared with a counterflow type heat exchanger, and so the former is advantageous in design. However, the counterflow type heat exchanger has higher heat conversion efficiency than that of the crossflow type heat exchanger in general, and so a counterflow type heat exchanger is advantageous in heat conversion efficiency.

Next, the following describes the first heat/acoustic wave conversion component 1A of FIG. 2 in details.

Figure 4:
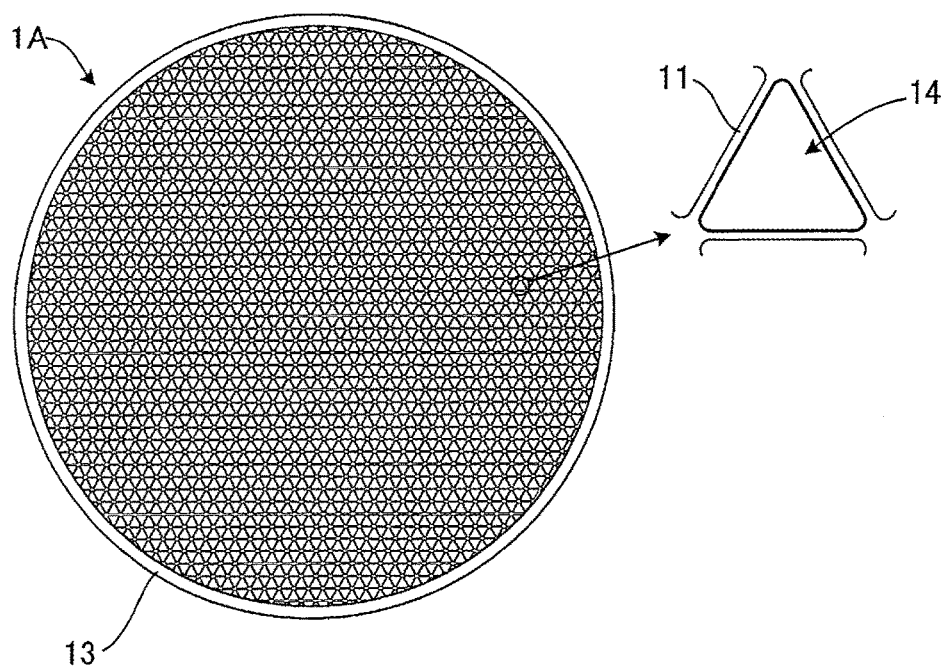
FIG. 4 is a cross-sectional view of the first heat/acoustic wave conversion component in a plane perpendicular to the extending direction of the cells of the first heat/acoustic wave conversion component of FIG. 2.

FIG. 4 is a cross-sectional view of the first heat/acoustic wave conversion component 1A in a plane perpendicular to the extending direction of the cells 14 of the first heat/acoustic wave conversion component 1A of FIG. 2.

As shown in FIG. 4, the first heat/acoustic wave conversion component 1A includes a plurality of cells 14, each being a thin-tube like through hole, that are defined by a partition wall 11, and the partition wall 11 as a whole is then surrounded with a circumferential wall 13 (not illustrated in FIG. 2). The circumferential wall 13 may be made of the same material as that of the partition wall 11.

As described above, the hydraulic diameter HD of the cells 14 is one of the important factors to generate acoustic waves by self-induced oscillations, and the hydraulic diameter HD of the cells 14 in the first heat/acoustic wave conversion component 1A has a very small value of 0.4 mm or less. Such cells with a very small hydraulic diameter HD can realize a sufficient thermoacoustic effect from the first heat/acoustic wave conversion component 1A. Conversely if the hydraulic diameter HD is larger than 0.4 mm, a small thermoacoustic effect only can be obtained.

Note here that for a larger thermoacoustic effect, it is advantageous to form as many as possible of the cells having a small hydraulic diameter HD as stated above. In other words, a larger open frontal area at the end faces of the first heat/acoustic wave conversion component 1A is more advantageous. The open frontal area of the first heat/acoustic wave conversion component 1A is high of 60% or more at each end face, from which a large thermoacoustic effect can be achieved. Conversely if the open frontal area is less than 60%, the number of cells contributing to the thermoacoustic effect is too small, and so a very large thermoacoustic effect cannot be achieved therefrom.

In this respect, however, if the open frontal area is too high, a hollow part of the first heat/acoustic wave conversion component 1A is too much, and so the durability and the strength of the first heat/acoustic wave conversion component 1A as a whole may deteriorate. Then, the open frontal area of the first heat/acoustic wave conversion component 1A is limited to 93% or less preferably. Actually if the open frontal area exceeds 93%, damage on the first heat/acoustic wave conversion component 1A due to impacts from acoustic waves generated or thermal distortion or warping (thermal stress) resulting from a temperature difference between both ends of the first heat/acoustic wave conversion component 1A cannot be ignored.

In this way, the first heat/acoustic wave conversion component 1A is preferably configured so that the open frontal area at the end faces of the first heat/acoustic wave conversion component 1A is 60% or more and 93% or less from the aspect of achieving adequate balance between a sufficient thermoacoustic effect and sufficient durability and strength. The open frontal area of 80% or more and 93% or less is preferable in the open frontal area of 60% or more and 93% or less.

The open frontal area can be obtained by taking an image of a cross section perpendicular to the extending direction by a microscope, and determining the material-part area S1 and the gap-part area S2 from the taken image of the cross section. Then the open frontal area can be obtained as S2/(S1+S2) based on S1 and S2.

In the first heat/acoustic wave conversion component 1A, the cells 14 preferably have a cross-sectional shape that is perpendicular to the extending direction of the cells such that it is a polygonal shape whose corners are curved, and the corners of the shape preferably have a curvature radius of 0.02 mm or more and 0.1 mm or less. FIG. 4 shows an exemplary shape of the cells 14 in the enlarged view on the upper right side, where the triangle has curved corners having the curvature radius of 0.02 mm or more and 0.1 mm or less. Such a curvature radius of 0.02 mm or more means a gently curved shape, and so the cells 14 can sufficiently resist an impact acting to crush the cells. This is based on the same reason for the shape of a hole such as a tunnel, i.e., a rounded shape is more resistant to an external force from the surrounding than an angular shape. On the other hand, if the curved part is too large, then the partition wall 11 close to the corners of the cells is thick and the open frontal area decreases, and accordingly the thermoacoustic effect obtained will be reduced. Then, the curvature radius is set at 0.1 mm or less, whereby a high thermoacoustic effect also can be kept at the same time.

The curvature radius at the corners of the cells 14 can be measured by taking an enlarged photo of the cells 14 in a cross section perpendicular to the extending direction and based on the cross-sectional shapes of the cells 14.

The cells 14 may have a shape in a plane perpendicular to the extending direction of the cells 14 that is various polygons, such as triangles, quadrangles, pentagons and hexagons as well as ellipses (including a perfect circle shape), where triangles, quadrangles and hexagons and their combinations are preferable. As shown in the enlarged view of the cells 14 on the upper right side of the first heat/acoustic wave conversion component 1A in FIG. 4, triangle cells 14 are particularly preferable. Such triangular cells 14 are particularly preferable because, among various polygonal shapes and elliptical cell shapes, triangular cell shapes are the most suitable for the arrangement of a lot of cells while minimizing the thickness of the partition wall. Note here that, in the case of a honeycomb structure for filter to remove particulates from exhaust gas of automobiles, if their cells have corners at acute angles, particulates easily accumulate at the corners unfortunately. Therefore, such a honeycomb structure does not actually have triangular cell shapes in many cases, although it can have such a shape in principle. On the other hand, in the case of a honeycomb structure to exert a thermoacoustic effect, such a problem does not happen to working fluid (gas such as rare gas) causing self-induced oscillations, and so triangular cell shapes (triangles with curved corners), which are the most suitable to arrange a lot of cells, can be used positively.

Let that L denotes the length between both end faces of the first heat/acoustic wave conversion component 1A, the first heat/acoustic wave conversion component has a ratio HD/L of the hydraulic diameter HD as stated above to the length L that is 0.005 or more and less than 0.02. If HD/L is less than 0.005, the first heat/acoustic wave conversion component 1A is too long as compared with the hydraulic diameter HD. Then working fluid in each cell of the first heat/acoustic wave conversion component 1A will be less affected from a temperature difference between both ends of the heat/acoustic wave conversion component. In this case, heat exchange between the working fluid in each cell and the partition wall 11 is not sufficient and so a sufficient thermoacoustic effect cannot be obtained. On the other hand, if HD/L is 0.02 or more, then the first heat/acoustic wave conversion component 1A is too short as compared with the hydraulic diameter HD. In this case, heat is transmitted through the partition wall 11 from the high-temperature side heat exchanger 2A side to the low-temperature side heat exchanger 3A in the first heat/acoustic wave conversion component 1A before heat exchange between the working fluid in each cell and the partition wall 11 becomes sufficient. As a result, a sufficient thermoacoustic effect still cannot be obtained. Then, the first heat/acoustic wave conversion component 1A has the ratio HD/L of 0.005 or more and less than 0.02, and so heat exchange between the working fluid in each cell and the partition wall 11 is sufficient. As a result, the first heat/acoustic wave conversion component 1A can have a sufficient thermoacoustic effect.

In the first heat/acoustic wave conversion component 1A, the materials making up the first heat/acoustic wave conversion component 1A, especially the materials making up the partition wall 11 have a ratio of thermal expansion at 20 to 800° C. that is 6 ppm/K or less preferably. One of the methods to implement such a state of a low ratio of thermal expansion includes using a honeycomb structure made of cordierite that has a low ratio of thermal expansion among ceramic materials. Herein, a "honeycomb structure made of cordierite" refers to a honeycomb structure prepared using a cordierite forming raw material that is formulated to have a chemical composition in the range of 42 to 56 mass % silica, 30 to 45 mass % alumina and 12 to 16 mass % magnesia as a ceramic raw material to prepare the honeycomb structure, the cordierite forming raw material forming cordierite after firing.

The ratio of thermal expansion can be measured, for example, by cutting out, from the first heat/acoustic wave conversion component 1A, a test piece that has a length of 10 mm or more along the elongation direction of each cell and having an area of a cross section including the elongation direction and the direction orthogonal to the elongation direction that is 4 mm$^2$ or more and 100 mm$^2$ or less, and measuring the ratio of thermal expansion of this test piece in the elongation direction using a differential thermal dilatometer using quartz as a reference comparative sample.

Such a ratio of thermal expansion at 20 to 800° C. of 6 ppm/K or less of the materials making up the partition wall 11 can suppress damage on the first heat/acoustic wave conversion component 1A when a temperature difference occurs at the both ends. A ratio of thermal expansion of 4 ppm/K or less is preferable in the ratio of thermal expansion of 6 ppm/K or less.

That is the detailed descriptions on the configuration of the acoustic-wave generator 100A of FIG. 2. The specific example of the configuration of the acoustic-wave generator 100A as stated above can be a specific example of the configuration of the heat transfer part 100B as well.

Next, the following describes a specific example of the exhaust system of FIG. 1, by way of specific examples of the power unit 1001 of FIG. 1.

Figure 5:
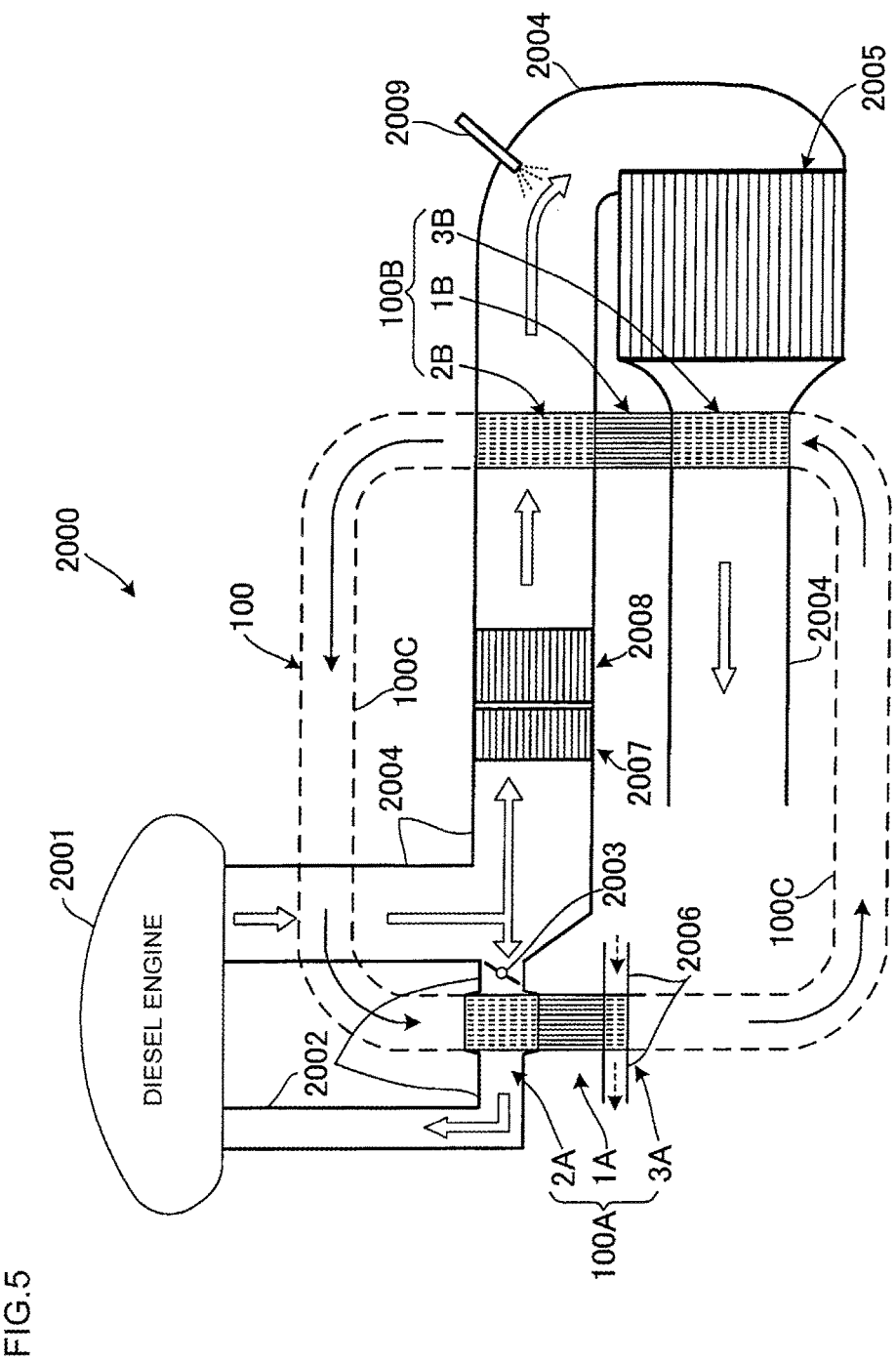
FIG. 5 schematically shows a configuration of one specific example of the exhaust system 1000 of FIG. 1 including a diesel engine as the power unit 1001 of FIG. 1.

FIG. 5 schematically shows a configuration of one specific example of the exhaust system 1000 of FIG. 1 including a diesel engine as the power unit 1001 of FIG. 1.

FIG. 5 shows an exhaust system 2000 connected to a diesel engine 2001 as one specific example of the exhaust system 1000 of FIG. 1. In the following description of this exhaust system 2000, like reference numerals designate like parts of FIG. 1 for description. Their duplicated descriptions are omitted by referring to the descriptions in FIG. 1.

The exhaust system 2000 of FIG. 5 plays a role for removing harmful substances for environment, such as particulates and nitrogen oxides, from exhaust gas generated when light oil is burned in the diesel engine 2001 for power generation. The exhaust system 2000 includes, in addition to the heating device 100 described referring to FIG. 1, an exhaust pipe 2004, a recirculation pipe 2002 and a DOC (Diesel Oxidation Catalyst) support 2007. The exhaust system 2000 further includes a DPF (Diesel Particulate Filter) 2008, a urea injection device 2009, and an SCR catalyst converter 2005. The SCR catalyst converter 2005 corresponds to one specific example of the purification unit 1005 of FIG. 1.

The exhaust pipe 2004 of FIG. 5 is connected to the diesel engine 2001, and is a pipe to define an exhaust path of exhaust gas generated at the diesel engine 2001 to the atmosphere. The recirculation pipe 2002 of FIG. 5 is connected to the exhaust pipe 2004 on this exhaust path, and is a pipe to define a recirculation path that separates a part of exhaust gas passing through the exhaust pipe 2004 and allows the part to flow back to the diesel engine 2001 as a part of intake gas for burning. Herein, the amount of exhaust gas flowing back to the diesel engine 2001 out of the entire exhaust gas emitted from the diesel engine 2001 is regulated by a valve 2003. The functions of the exhaust pipe 2004, the recirculation pipe 2002, and the valve 2003 are substantially the same as those of the exhaust pipe 1004, the recirculation pipe 1002 and the valve 1003 described referring to FIG. 1, respectively.

The DOC support 2007 has a function of promoting oxidization of hydrocarbons and carbon monoxide during burning (oxidization) for removal of particulates (carbon-based particulates) such as soot trapped by a DPF described later, and also has a function of oxidizing nitrogen monoxide into nitrogen dioxide to relatively increase the amount of the nitrogen dioxide. When the amount of nitrogen dioxide is relatively larger than that of nitrogen monoxide, the oxidization reaction of carbon-based particulates easily proceeds continuously. For the DOC support 2007, a conventionally known support can be used. For instance, oxidation catalyst (typically catalyst containing platinum group elements such as platinum and palladium) that promotes an oxidization reaction of hydrocarbons and carbon monoxide may be loaded on cell inner wall faces of a honeycomb structure having a plurality of cells.

The DPF 2008 has a function of trapping particulates (carbon-based particulates) such as soot in exhaust gas. For the DPF 2008, a conventionally known one can be used. For instance, the DPF 2008 may be based on a scheme such that openings at one end face of a plurality of cells of a ceramic honeycomb structure are plugged so as to trap particulates (carbon-based particulates) at the cell inner walls.

The urea injection device 2009 injects urea to exhaust gas in the exhaust pipe 2004 before flowing into the SCR catalyst converter 2005 described later for mixing with the exhaust gas.

The SCR catalyst converter 2005 has SCR catalyst to promote a reduction reaction of nitrogen oxides using ammonia as reducing agent, and is disposed downstream from the urea injection device 2009 in the exhausting direction on the exhaust path of exhaust gas. Using ammonia generated through hydrolysis of urea injected by the urea injection device 2009 at a high temperature and the SCR catalyst as stated above, the SCR catalyst converter 2005 reduces nitrogen oxides in the exhaust gas to generate water and nitrogen. For the SCR catalyst converter 2005, a conventionally known one can be used. For instance, SCR catalyst may be loaded on the inner wall faces of a ceramic honeycomb structure having a plurality of cells. Examples of the SCR catalyst include SCR catalyst containing oxides of vanadium, molybdenum, tungsten or the like and zeolite. Purification ability of exhaust gas by the SCR catalyst can be activated when the SCR catalyst is heated.

The heating device 100 heats exhaust gas before urea is injected to the exhaust gas by the urea injection device 2009, that flows through the exhaust pipe 2004 without flowing into the recirculation pipe 2002. That is, the upstream side heat exchanger 2B of the heat transfer part 100B in the heating device 100 is coupled to the exhaust pipe 2004 at a position upstream from the urea injection device in the exhausting direction, and supplies heat to the exhaust gas in the exhaust pipe 2004 passing through this coupling position (see FIG. 5). Receiving the heat supplied, the exhaust gas flows into the SCR catalyst converter 2005 (after receiving the injection of urea), whereby the SCR catalyst of the SCR catalyst converter 2005 is heated, and the purification ability for the exhaust gas is activated. In this situation, the injected urea evaporates sufficiently by the exhaust gas at high temperatures that flows from the upstream from the injection position in the exhausting direction, and is hydrolyzed to ammonia. As a result, a reduction reaction of nitrogen oxides using the ammonia as a reducing agent can be promoted sufficiently. If exhaust gas to which urea is injected beforehand by the urea injection device 2009 is heated, urea hardly evaporates in the exhaust gas at a relatively low temperature before heating. This may cause the problem that a reduction reaction of nitrogen oxides does not progress sufficiently because of the shortage of ammonia.

In the exhaust system 2000 of FIG. 5, the temperature of exhaust gas that is separated from exhaust gas passing through the exhaust pipe 2004 and that flows into the recirculation pipe 2002 is about 150 to 600° C. that is temperatures of the exhaust gas immediately after exhausting from a diesel engine in a typical exhaust system for diesel engines. The temperature of exhaust gas immediately after passing through the DPF 2008 (exhaust gas before heating by the heating device 100) is at outdoor air temperatures to about 300° C. similarly to a typical exhaust system for diesel engines. Meanwhile, the temperature of the SCR catalyst to exert sufficient purification ability by being heated is 200° C. or higher. The heating device 100 heats exhaust gas after passing through the DPF 2008 and before being heated by the thermoacoustic effect based on the heat of the exhaust gas flowing through the recirculation pipe 2002 to be at the above-stated temperatures or higher to exert sufficient purification ability of the SCR catalyst.

The principle and the mechanism of heating by the heating device 100 is the same as those described referring to FIG. 1, and the descriptions thereon are omitted by referring to the descriptions. Note here that in general a power system based on a diesel engine often includes a cooling water-circulation mechanism to cool devices that tend to increase in temperature, such as an engine, with water. Then, in the acoustic-wave generator 100A of the heating device 100 in FIG. 5, the low-temperature side heat exchanger 3A is configured so that water at ambient temperatures in a cooling pipe 2006 of such a water-circulation mechanism is used as the cooling medium as well to cool (absorb heat from) the end face of the first heat/acoustic wave conversion component 1A close to the low-temperature side heat exchanger 3A. As one specific example of the heating device 100 of FIG. 5, the heating device 100 of FIG. 1 including the specific example of the acoustic-wave generator 100A (and the heat transfer part 100B) of FIG. 1 which is described referring to FIGS. 2, 3 and 4 can be used.

Next, the following describes another specific example of the exhaust system of FIG. 1, by way of another specific example of the power unit 1001 of FIG. 1.

Figure 6:
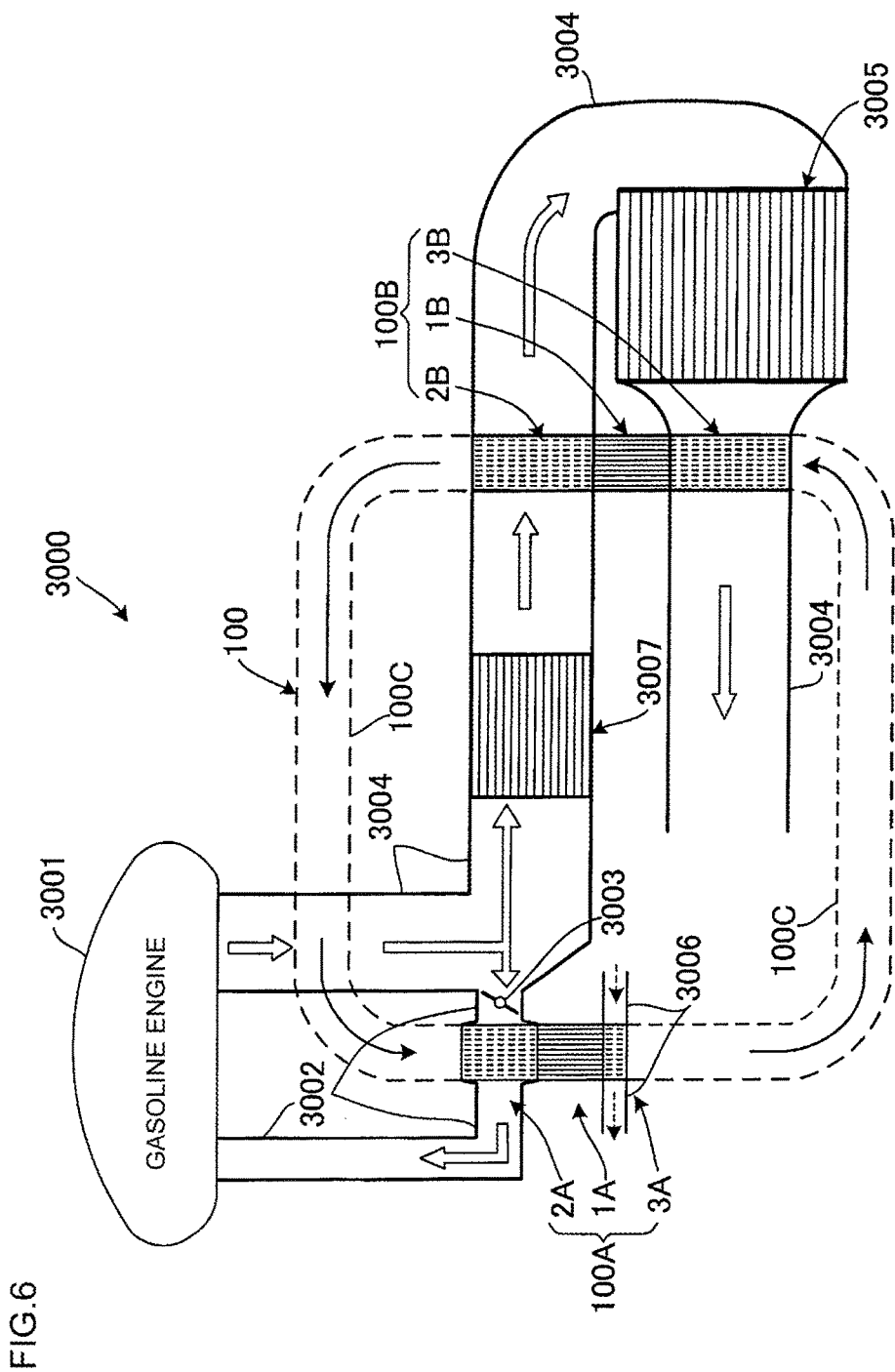
FIG. 6 schematically shows a configuration of one specific example of the exhaust system 1000 of FIG. 1 including a gasoline engine as the power unit 1001 of FIG. 1.

FIG. 6 schematically shows a configuration of one specific example of the exhaust system 1000 of FIG. 1 including a gasoline engine as the power unit 1001 of FIG. 1.

FIG. 6 shows an exhaust system 3000 connected to a gasoline engine 3001 as one specific example of the exhaust system 1000 of FIG. 1. In the following description of this exhaust system 3000, like reference numerals designate like parts of FIG. 1 for description. Their duplicated descriptions are omitted by referring to the descriptions.

The exhaust system 3000 of FIG. 6 plays a role for removing nitrogen oxides, carbon monoxide, and hydrocarbons (HC) from exhaust gas generated when gasoline is burned in the gasoline engine 3001 for power generation. The exhaust system 3000 includes, in addition to the heating device 100 described referring to FIG. 1, an exhaust pipe 3004, a recirculation pipe 3002, a first three-way catalyst unit 3007, and a second three-way catalyst unit 3005. The second three-way catalyst unit 3005 corresponds to one specific example of the purification unit 1005 of FIG. 1 (see the below descriptions on the activation of purification ability of catalyst that each three-way catalyst unit has).

The exhaust pipe 3004 of FIG. 6 is connected to the gasoline engine 3001, and is a pipe to define an exhaust path of exhaust gas generated at the gasoline engine 3001 to the atmosphere. The recirculation pipe 3002 of FIG. 6 is connected to the exhaust pipe 3004 on this exhaust path, and is a pipe to define a recirculation path that separates a part of exhaust gas passing through the exhaust pipe 3004 and allows the part to flow back to the gasoline engine 3001 as a part of intake gas for burning. Herein, the amount of exhaust gas flowing back to the gasoline engine 3001 out of the entire exhaust gas emitted from the gasoline engine 3001 is regulated by a valve 3003. The functions of the exhaust pipe 3004, the recirculation pipe 3002, and the valve 3003 are substantially the same as those of the exhaust pipe 1004, the recirculation pipe 1002 and the valve 1003 described referring to FIG. 1, respectively.

The first three-way catalyst unit 3007 and the second three-way catalyst unit 3005 purify exhaust gas that flows through the exhaust pipe 3004 without flowing into the recirculation pipe 3002, and are disposed on the exhaust path of this exhaust gas. These first three-way catalyst unit 3007 and second three-way catalyst unit 3005 have three-way catalyst that promotes a chemical reaction to convert harmful substances such as nitrogen oxides, carbon monoxide and hydrocarbons (HC) into relatively not-harmful components such as nitrogen, water and carbon dioxide. For these first three-way catalyst unit 3007 and second three-way catalyst unit 3005, a conventionally known unit can be used. For instance, three-way catalyst may be loaded on the inner wall faces of a ceramic honeycomb structure having a plurality of cells. Examples of three-way catalyst include catalyst containing platinum group elements such as platinum, palladium and rhodium. Purification ability of exhaust gas by the three-way catalyst can be activated when the three-way catalyst is heated.

In the exhaust system 3000 of FIG. 6, the temperature of exhaust gas that is separated from exhaust gas passing through the exhaust pipe 3004 and that flows into the recirculation pipe 3002 is about 100 to 1000° C. that is temperatures of the exhaust gas immediately after exhausting from a gasoline engine in a typical exhaust system for gasoline engines. The first three-way catalyst unit 3007 is a so-called three-way catalyst unit immediately below the gasoline engine 3001 that is disposed in the vicinity of the gasoline engine 3001. Therefore, the temperature of exhaust gas flowing into the first three-way catalyst unit 3007 also is about 100 to 1000° C. Meanwhile, the second three-way catalyst unit 3005 is a so-called underfloor three-way catalyst unit that is disposed relatively away from the gasoline engine 3001 as compared with the first three-way catalyst unit 3007. Therefore the temperature of exhaust gas flowing into the second three-way catalyst unit 3005 is relatively lower than the temperature of the exhaust gas flowing into the first three-way catalyst unit 3007 and is at outdoor air temperatures to about 500° C. unless it is heated by the heating device 100. Note here that the temperature of the three-way catalyst to exert sufficient purification ability by being heated is 400° C. or higher. That is, the first three-way catalyst unit 3007 can be expected to exert sufficient purification ability even when the exhaust gas flowing into the first three-way catalyst unit 3007 is not heated. On the contrary, the second three-way catalyst unit 3005 may not exert sufficient purification ability if the exhaust gas flowing into the second three-way catalyst unit 3005 is not heated.

Then, in the exhaust system 3000 of FIG. 6, the heating device 100 heats the exhaust gas before flowing into the second three-way catalyst unit 3005, that has been subjected to purification by the first three-way catalyst unit 3007 and that flows out from the first three-way catalyst unit 3007. That is, the upstream side heat exchanger 2B of the heat transfer part 100B in the heating device 100 is coupled to the exhaust pipe 3004 at a position downstream from the first three-way catalyst unit 3007 in the exhausting direction and upstream from the second three-way catalyst unit 3005 in the exhausting direction, and supplies heat to the exhaust gas in the exhaust pipe 3004 passing through this coupling position (see FIG. 6). The exhaust gas receiving the heat supplied flows into the second three-way catalyst unit 3005, whereby three-way catalyst of the second three-way catalyst unit 3005 can be heated to the temperatures of 400° C. or higher, and the purification ability for the exhaust gas can be exerted sufficiently.

The principle and the mechanism of heating by the heating device 100 is the same as those described referring to FIG. 1, and the descriptions thereon are omitted by referring to the descriptions. Note here that in general a power system based on a gasoline engine often includes a cooling water-circulation mechanism to cool devices that tend to increase in temperature, such as an engine, with water. Then, in the acoustic-wave generator 100A of the heating device 100 in FIG. 6, the low-temperature side heat exchanger 3A is configured so that water at ambient temperatures in a cooling pipe 3006 of such a water-circulation mechanism is used as the cooling medium as well to cool (absorb heat from) the end face of the first heat/acoustic wave conversion component 1A close to the low-temperature side heat exchanger 3A. As one specific example of the heating device 100 of FIG. 6, the heating device 100 of FIG. 1 including the specific example of the acoustic-wave generator 100A (and the heat transfer part 100B) of FIG. 1 which is described referring to FIGS. 2, 3 and 4 can be used.

In general if the temperature of exhaust gas is low when a gasoline engine starts, three-way catalyst of a catalyst unit may generate a problem about the activation of the purification ability of the three-way catalyst. Such a problem itself is common to both of the above-mentioned first three-way catalyst unit 3007 and the above-mentioned second three-way catalyst unit 3005 as stated above. However, when a certain time has passed since the starting of the gasoline engine, the exhaust gas flowing into the first three-way catalyst unit 3007 becomes at high temperatures, and therefore the three-way catalyst of the first three-way catalyst unit 3007 does not have a big problem after that about the activation of the purification ability thereof. On the contrary, the exhaust gas flowing into the second three-way catalyst unit 3005 does not become at high temperatures even when sufficient time has elapsed since the starting of the gasoline engine (unless it is heated by the heating device 100). In such a situation, it is very effective to heat by the heating device 100 so as to exert the purification ability of the three-way catalyst of the second three-way catalyst unit 3005 sufficiently.

That is the descriptions on the specific examples of the exhaust system 1000 of FIG. 1 depending on the types of the power unit 1001.

Next, the following describes a method for manufacturing the exhaust system 1000 having the heating device 100 of FIG. 1, in which the specific examples of the acoustic-wave generator 100A (and the heat transfer part 100B) of FIGS. 2 to 4 is used. In the exhaust system 1000, the elements other than the heating device 100, such as the exhaust pipe 1004, the recirculation pipe 1002, and the purification unit 1005 can be manufactured by a method for manufacturing these elements in a conventional exhaust system. The following mainly describes the heating device 100.

Firstly, a method for manufacturing the acoustic-wave generator 100A is described. To begin with, a method for manufacturing the first heat/acoustic wave conversion component 1A is described below.

Binder, dispersing agent, pore former, water and the like are added to a ceramic raw material to prepare a forming raw material. The ceramic raw material preferably includes one or two or more in combination of a cordierite forming raw material, a silicon carbide-cordierite based composite material, aluminum titanate, silicon carbide, a silicon-silicon carbide based composite material, alumina, mullite, spinel, lithium aluminum silicate, and Fe—Cr—Al based alloy. Among them, a cordierite forming raw material is preferable. As stated above, the cordierite forming raw material is a ceramic raw material formulated to have a chemical composition in the range of 42 to 56 mass % of silica, 30 to 45 mass % of alumina and 12 to 16 mass % of magnesia, and forms cordierite after firing. The ceramic raw material preferably is contained to be 40 to 90 mass % with reference to the forming raw material as a whole.

Exemplary binder includes methyl cellulose, hydroxypropoxyl cellulose, hydroxyethylcellulose, carboxymethylcellulose, or polyvinyl alcohol. Among them, methyl cellulose and hydroxypropoxyl cellulose are preferably used together. The content of the binder is preferably 2 to 20 mass % with reference to the forming raw material as a whole.

The content of water is preferably 7 to 45 mass % with reference to the forming raw material as a whole.

Examples of the dispersing agent used include ethylene glycol, dextrin, fatty acid soap, and polyalcohol. They may be used alone or in combination of two or more types. The content of the dispersing agent is preferably 5 mass % or less with reference to the forming raw material as a whole.

Examples of the pore former used include starch, foamable resin, water absorbable resin or silica gel. Pore former may not be used.

Next, a kneaded material is prepared by kneading the forming raw material. A method for preparing a kneaded material by kneading the forming raw material is not limited especially. For instance, a kneader or a vacuum pugmill may be used for this purpose.

Next, the kneaded material is extruded, whereby a honeycomb formed body is prepared, including a partition wall defining a plurality of cells. For the extrusion, a die having a shape in accordance with the hydraulic diameter and the open frontal area shape of the cells, the shape of the first heat/acoustic wave conversion component 1A, the shape of the cells, and the period of the cells as stated above is preferably used. A preferable material of the die is cemented carbide having wear resistance. Values of the hydraulic diameter, the open frontal area or the like of each cell of the honeycomb formed body are determined preferably while considering contraction generated during drying and firing described later as well.

Herein, when such a first heat/acoustic wave conversion component 1A having a very small hydraulic diameter and large open frontal area (high cell density) of the cells as stated above for a larger thermoacoustic effect is manufactured, the following two problems exist. These two problems may prevent such a first heat/acoustic wave conversion component 1A from being manufactured by simply using a conventional extrusion method as it is (using a similar extrusion method other than that a die is replaced with a high-density die to form pores) used for a conventional honeycomb structure to load catalyst for exhaust gas purification, which is free from such constraints to achieve a larger thermoacoustic effect.

The first problem is that, during extrusion, kneaded material extruded at a high temperature adheres to the holes in a forming die, which easily generates clogging. This problem is mentioned by the above-stated Patent Document, JP-A-2012-237295 also in paragraph [0021].

The second problem is that a die used for a honeycomb structure having very small hydraulic diameter and large open frontal area (high cell density) of each cell as in the first heat/acoustic wave conversion component 1A as stated above inevitably includes a very thin and minute part (typically a part of about 0.3 mm in thickness). Such a minute part often is damaged (e.g., is torn) by viscous friction during kneaded material extrusion.

Then, the manufacturing method of the first heat/acoustic wave conversion component 1A as stated above has the following configuration to solve these two problems.

For the first problem, prior to the extrusion using a die (hereinafter called a real die) suitable for the first heat/acoustic wave conversion component 1A having very small hydraulic diameter and large open frontal area (high cell density), i.e., having a hydraulic diameter of each cell that is 0.4 mm or less and an open frontal area that is 60% or more and 93% or less, a kneaded material is extruded using another die (hereinafter called a dummy die) having a very small thickness of ribs that is 0.04 mm or more and 0.09 mm or less. The "thickness of ribs" here refers to the thickness of the partition wall of the honeycomb formed body, and means a slit width of the die. Each slit of the die is a hole to discharge the kneaded material and is to determine the shape of each partition wall part at the honeycomb structure to be manufactured. In the following, the "thickness of ribs" means the slit width. The extrusion using such a dummy die can remove beforehand the component of the kneaded material that tends to be a cause of the clogging. Then extrusion by a real die is performed for the kneaded material subjected to the extrusion, whereby clogging as stated above can be suppressed.

The second problem is solved by reducing viscosity of the kneaded material used for extrusion greatly as compared with the viscosity of a kneaded material used for a conventional honeycomb structure to load catalyst for exhaust gas purification so as to reduce the viscous friction while keeping the range of a shape-holding property (i.e. the shape of the formed body is not distorted) of the formed body of the first heat/acoustic wave conversion component 1A during extrusion. To reduce the viscosity of kneaded material while satisfying the condition to keep a shape-holding property in this way, the ratio of water in the kneaded material has to be more strictly controlled than in the manufacturing of a conventional honeycomb structure to load catalyst for exhaust gas purification (i.e., keeping an error between the control target of the water ratio and the actual water ratio in a very narrow range). Specifically, the ratio of water in the kneaded material is 40 to 42 parts by mass with reference to 100 parts by mass of the kneaded material solid component that is used to manufacture the first heat/acoustic wave conversion component 1A as stated above, while the ratio of water in the kneaded material is 25 to 35 parts by mass with reference to 100 parts by mass of the kneaded material solid component that is used to manufacture a conventional honeycomb structure to load catalyst for exhaust gas purification. When the ratio of water in the kneaded material increases, then viscosity of the kneaded material decreases and adequate fluctuations occur in the shape of the formed body of the first heat/acoustic wave conversion component 1A. This leads to another advantageous effect that self-induced oscillations of acoustic waves likely occur.

The following continues the description on the following processing for the honeycomb formed body that is obtained by the extrusion.

The thus obtained honeycomb formed body is dried before firing. A method for drying is not limited especially, and exemplary methods include an electromagnetic wave heating method such as microwave heat-drying and high-frequency induction heating drying and an external heating method such as hot air drying and superheated steam drying. A certain amount of water may be dried by an electromagnetic wave heating method, followed by an external heating method to dry the remaining water. In this case, it is preferable that, 30 to 90 mass % of water with reference to the water amount before drying is removed by an electromagnetic heating method, followed by an external heating method to reduce water amount to 3 mass % or less. A preferable electromagnetic wave heating method includes induction heating drying, and a preferable external heating method includes hot air drying.

If the length of the honeycomb formed body in the cell extending direction is not a desired length, it is preferable to cut both of the end faces (end parts) to have the desired length. Although a method for cutting is not limited especially, exemplary method includes a method using a circular saw cutter.

Next, this honeycomb formed body is fired. It is preferable to perform calcination before firing to remove the binder and the like. The calcination is preferably performed at 400 to 500° C. for 0.5 to 20 hours in the ambient atmosphere. A method for calcination or firing (main firing) is not limited especially, and they may be performed using an electric furnace, a gas furnace, or the like. As the firing (main firing) conditions, it is preferably heated at 1,300 to 1,500° C. for 1 to 20 hours in an inert atmosphere of nitrogen, argon, or the like when a silicon-silicon carbide based composite material is used, for example. When an oxide-based material is used, it is preferably heated at 1,300 to 1,500° C. for 1 to 20 hours in an oxygen atmosphere.

Finally, if it is required to be a desired cross-sectional shape (e.g., a circle as in FIG. 4) of the first heat/acoustic wave conversion component 1A, the circumferential part of the honeycomb formed body after firing is cut as needed to correct the shape. Then, an outer coating material is applied to the circumferential face of the honeycomb formed body after cutting, followed by drying, whereby a circumferential wall 13 is formed. Herein, the outer coating material used may be slurry, for example, which is prepared by adding an additive such as organic binder, foamable resin or dispersing agent to a raw material including inorganic particles and colloidal oxide, to which water is added, followed by kneading. Herein exemplary inorganic particles include particles made of a ceramic material containing one or two or more in combination of cordierite, alumina, aluminum titanate, silicon carbide, silicon nitride, mullite, zirconia, zirconium phosphate and titania, or particles of Fe—Cr—Al-based metal, nickel-based metal and silicon (metal silicon)-silicon carbide based composite materials. Exemplary colloidal oxide includes silica sol and alumina sol. A method for applying the outer coating material is not limited especially, and for example, the coating material may be coated with a rubber spatula, for example, while rotating the honeycomb formed body after cutting on a wheel.

Through these steps, the first heat/acoustic wave conversion component 1A is finally completed.

Next the following describes a method for manufacturing the high-temperature side heat exchanger 2A of FIG. 2.

The heat-exchanging honeycomb structure 20 of the high-temperature side heat exchanger 2A in FIGS. 2 and 3 can be manufactured, when a ceramic martial containing SiC (silicon carbide) is used as its main component, by a method which is obtained by partially changing the method for manufacturing the first heat/acoustic wave conversion component 1A as stated above. Specifically, the method is different in that mixture of carbon powder (e.g., graphite powder) with SiC powder is used as the ceramic raw material and a die suitable for a honeycomb formed body having a relatively large hydraulic diameter HD of cells is used as the die for extrusion.

Especially when the heat-exchanging honeycomb structure 20 containing a Si impregnated SiC composite material as a main component is manufactured, it is preferable that a kneaded material prepared by mixing SiC powder with carbon powder and kneading for adjustment is formed to be a honeycomb formed body, then drying and firing processing are performed thereto, and then molten silicon (Si) is impregnated in this honeycomb formed body. Such processing can form a configuration where coagulation of metal Si (metal silicon) surrounds the surface of SiC particles after the firing processing, and SiC particles are mutually bonded via metal Si. Such a configuration can achieve high heat durability and heat conductivity while having the dense configuration with small porosity. In addition to the molten silicon (Si), other metals such as Al, Ni, Cu, Ag, Be, Mg, and Ti may be used for impregnation. In this case, after firing, coagulation of metal Si (metal silicon) and other metals used for impregnation surrounds the surface of SiC particles, and SiC particles are mutually bonded via metal Si and other metals used for impregnation in the formed configuration. Such a configuration also can achieve high heat durability and heat conductivity while having the dense configuration with small porosity.

The heat-exchanging honeycomb structure 20 made of metal may be manufactured by a conventional manufacturing method that is used to manufacture a metal honeycomb structure, such as method for forming a honeycomb structure using a mold or a method for forming a honeycomb structure by cutting.

The heat-exchanger casing in FIG. 3 that surrounds the heat-exchanging honeycomb structure 20 can be manufactured by processing using the same material as that of the recirculation pipe 1002, for example, and a conventional manufacturing method can be used therefor.

In this way, the high-temperature side heat exchanger 2A is finally completed.

The low-temperature side heat exchanger 3A of FIG. 2 can be manufactured using a conventionally known method for manufacturing a heat exchanger.

That is the description on the method for manufacturing the acoustic-wave generator 100A.

The heat transfer part 100B can have a configuration similar to the acoustic-wave generator 100A as stated above, and so it can be manufactured similarly to the acoustic-wave generator 100A as stated above.

The transmission pipe 100C can be manufactured by forming a material with high durability into an annular shape (note here that an annular shape with a part thereof missing so as to enable connection with the acoustic-wave generator 100A and the heat transfer part 100B). The material with high durability is not limited especially, and examples thereof include metal such as iron, a hard plastic material, hardened glass, as well as a ceramic material (e.g., those listed for the material of the first heat/acoustic wave conversion component 1A as stated above).

That is the description on the method for manufacturing the heating device 100.

As stated above, for the elements such as the exhaust pipe 1004, the recirculation pipe 1002 and the purification unit 1005 other than the heating device 100 in the exhaust system 1000, a method for manufacturing these elements of a conventional exhaust system can be used as it is. For instance, the exhaust pipe 1004 and the recirculation pipe 1002 can be manufactured by forming a material with high heat resistance to have a form that is connectable to the acoustic-wave generator 100A and the heat transfer part 100B as shown in FIG. 1. The material with high heat resistance is not limited especially, and specific examples thereof include high heat-resistance stainless steel, metal such as iron or copper, as well as a ceramic material (e.g., those listed for the material of the first heat/acoustic wave conversion component 1A and the heat-exchanging honeycomb structure 20 of FIG. 2). The purification unit 1005 can be manufactured by a manufacturing method for a conventional purification unit depending on the types of the power unit. For instance, when an exhaust system is for a diesel engine as described in the exhaust system 2000 of FIG. 5, a method for manufacturing a conventional SCR catalyst converter can be used. When an exhaust system is for a gasoline engine as described in the exhaust system 3000 of FIG. 6, a method for manufacturing a conventional three-way catalyst converter can be used.

That is the description on the method for manufacturing the exhaust system 1000 (e.g., the exhaust system 2000 of FIG. 5 or the exhaust system 3000 of FIG. 6) having the heating device 100 of FIG. 1 in which the specific examples of the acoustic-wave generator 100A (and the heat transfer part 100B) of FIGS. 2 to 4 is (are) used.

EXAMPLES

The following describes specific examples having the advantageous effects of the present invention, and the present invention is by no means limited to these examples.

Example 1

Example 1 is an example of the exhaust system 2000 of FIG. 5 in which the specific examples of FIGS. 2 to 4 as stated above for the acoustic-wave generator 100A and the heat transfer part 100B are used. The exhaust system of Example 1 is connected to a diesel engine having displacement of 10 L, and the following describes Example 1 by way of specific numerical values.

For the exhaust pipe, a tubular metal pipe of 60 mm in diameter was used, and for the recirculation pipe, a tubular metal pipe of 30 mm in diameter was used. For the DOC support, the DPF, and the SCR catalyst converter, a round pillar-shaped honeycomb structure of 300 mm in diameter was used, and especially for the DOC support and the SCR catalyst converter, oxidation catalyst containing platinum group elements and zeolite-based SCR catalyst were disposed on the inner wall faces of the cells of the honeycomb structures, respectively. For the urea injection device, an injector for SCR catalyst converter in the marketplace was used.

As the working fluid, helium gas having pressure of 30 atmospheres was used, and the transmission pipe of the working fluid used had a diameter of 20 mm. For the first heat/acoustic wave conversion component of the acoustic-wave generator, a cordierite honeycomb structure was used, having a round-pillar shape of 40 mm in diameter and 60 mm in length, where each cell had a hydraulic diameter of 0.2 mm and an open frontal area at end faces was about 78%. In Example 1, the second heat/acoustic wave conversion component of the heat transfer part was a cordierite honeycomb structure that was the same as in the first heat/acoustic wave conversion component, and the following collectively describes both of them as a heat/acoustic wave conversion component simply.

The heat/acoustic wave conversion component was manufactured as follows.

Cordierite forming raw material was used as the ceramic raw material, and 1 part by mass of pore former, 35 parts by mass of dispersing medium, 6 parts by mass of organic binder, and 0.5 parts by mass of dispersing agent were added to 100 parts by mass of the cordierite raw material, followed by mixing and kneading to prepare a kneaded material. The cordierite raw material used included 38.9 parts by mass of talc of 3 µm in average particle diameter, 40.7 parts by mass of kaolin of 1 µm in average particle diameter, 5.9 parts by mass of alumina of 0.3 µm in average particle diameter, and 11.5 parts by mass of boehmite of 0.5 µm in average particle diameter. Herein the average particle diameter refers to a median diameter (d50) in the particle distribution of each raw material.

Water was used as the dispersing medium. Hydroxypropylmethylcellulose was used as the organic binder. Ethylene glycol was used as the dispersing agent.

Next, the thus obtained kneaded material was extruded using a die, so that a honeycomb formed body including triangular cells and having a circular overall shape was prepared. During this extrusion, prior to the extrusion using a real die corresponding to the heat/acoustic wave conversion component of Example 1, the kneaded material was extruded using a dummy die of about 0.07 mm in rib thickness as stated above. Then, using the kneaded material after the extrusion using this dummy die, extrusion using the real die was executed. At this time, the ratio of water in the kneaded material used for the extrusion using the real die was strictly controlled in the kneaded material component so that it was 41 parts by mass (error was within ±1 part by mass) with reference to 100 parts by mass of the kneaded material solid component.

Then, this honeycomb formed body was dried by a microwave dryer, and further was dried completely by a hot-air drier, and then both end faces of the honeycomb formed body were cut so as to adjust the length of the honeycomb formed body in the cell extending direction. Such a honeycomb formed body was dried by a hot-air drier, and then was fired at 1,445° C. for 5 hours.

Finally, the circumferential part of the honeycomb formed body after the firing step was cut as needed to correct the shape to be a round pillar-shape. Then, an outer coating material was applied to the circumferential face of the honeycomb formed body after cutting, followed by drying, whereby a circumferential wall was formed. Herein, the outer coating material was slurry prepared by adding organic binder and dispersing agent to a raw material including cordierite particles and silica sol, to which water was added and kneaded. As a method for applying the outer coating material, the coating material was coated with a rubber spatula, for example, while rotating the honeycomb formed body after cutting on a wheel.

Through these steps, a heat/acoustic wave conversion component was completed. For the completed heat/acoustic wave conversion component, the hydraulic diameter HD of the cells in a plane perpendicular (perpendicular plane) to the cell extending direction and the open frontal area at the end faces of the heat/acoustic wave conversion component were measured. As a result, the hydraulic diameter HD of the cells was 0.2 mm, and the open frontal area at the end faces of the heat/acoustic wave conversion component was about 78% as stated above.

The hydraulic diameter HD of the cells was obtained as follows. That is, an enlarged photo of the cross section of the heat/acoustic wave conversion component in the perpendicular plane was taken, and ten cells were selected at random in this enlarged photo of the cross section. Then, the hydraulic diameter of each was calculated by the expression to define the hydraulic diameter: HD=4×S/C, where S denotes the cross-sectional area of the cell and C denotes the perimeter of this section, and then average of them was calculated as the hydraulic diameter.

The open frontal area was obtained by taking an image of the cross section in the perpendicular plane by a microscope, and finding the material-part area S1 and the gap-part area S2 from the image taken of the cross section. Then the open frontal area was obtained as S2/(S1+S2) based on S1 and S2. Note that the open frontal area at the cross section as a whole is considered to be equal to the open frontal area at the end face, and then the open frontal area at the cross section as a whole is considered as the open frontal area at the end face.

For the high-temperature side heat exchanger of the acoustic-wave generator, the heat-exchanger casing coupled to the recirculation pipe of 30 mm in diameter was prepared, and the high-temperature side heat exchanger was manufactured as follows. Note here that, in Example 1, the upstream side heat exchanger of the heat transfer part used was the same as the high-temperature side heat exchanger of the acoustic-wave generator except that the upstream side heat exchanger was coupled to the exhaust pipe of 60 mm in diameter, and was manufactured by a similar manufacturing method.

A kneaded material was prepared by a similar method except that, in the method for manufacturing the heat/acoustic wave conversion component as stated above, mixture of carbon powder (e.g., graphite powder) with SiC powder was used instead of the cordierite forming raw material.

Next, the thus obtained kneaded material was extruded using a die, so that a honeycomb formed body including triangular cells was prepared. This die was suitable to prepare a honeycomb formed body having a relatively large hydraulic diameter of cells as compared with the die for the honeycomb formed body that was used in the manufacturing method of the heat/acoustic wave conversion component in Example 1 as stated above.

Then the honeycomb formed body after extrusion was dried by a microwave dryer, and then were dried completely by a hot-air drier, and then both end faces of the honeycomb formed body were cut so as to adjust the length of the honeycomb formed body in the cell penetrating direction. Such a honeycomb formed body was dried by a hot-air drier, and then was fired at 1,445° C. for 5 hours.

After firing the formed body, this honeycomb formed body was impregnated with molten silicon (Si).

Next, the circumferential part of the honeycomb formed body after impregnation was cut to have a round-pillar shape, so that the cross-sectional shape of the honeycomb formed body agreed with the shape of the heat/acoustic wave component as stated above. Then, an outer coating material was applied to the circumferential face of the honeycomb formed bodies after cutting, followed by drying.

An application method at this time was using a rubber spatula, while rotating the honeycomb formed body after cutting on a wheel. The outer coating material used was slurry, prepared by adding organic binder, foamable resin and dispersing agent to a raw material including particles of a silicon (metal silicon)-silicon carbide based material and silica sol similar to the material making up the honeycomb formed body after sintering, to which water was added, followed by kneading.

Finally, slit-formation processing was performed using a diamond grinding wheel to the circumferential wall of the honeycomb formed body, to which the outer coating material was applied, followed by drying, so that a slit was formed along the cell penetrating direction. Through such process, the heat-exchanging honeycomb structure was completed.

The thus completed heat-exchanging honeycomb structure was attached to the heat-exchanger casing, whereby the high-temperature side heat exchanger was completed.

The low-temperature side heat exchanger of the acoustic-wave generator was manufactured by preparing the heat-exchanger casing connected to a radiator and coupled to a cooling pipe through which water at about 40° C. for engine cooling flowed, and by assembling the mesh lamination body at a center part of this heat-exchanger casing. Herein, this heat-exchanger casing had a shape that was substantially the same as that of the heat-exchanger casing of the high-temperature side heat exchanger other than the size. In Example 1, the downstream side heat exchanger of the heat transfer part was the same as the low-temperature side heat exchanger of the acoustic-wave generator other than that the former was coupled to the exhaust pipe of 60 mm in diameter, and was manufactured by a similar manufacturing method.

As other members of the acoustic-wave generator and the heat transfer part of Example 1, e.g., the metal member and the interference member, a metal member prepared by processing a copper plate and an interference member made of known insulating glass fiber (such as Siliglass) having heat durability were used, respectively.

An operation experiment was conducted using the exhaust system for diesel engine of Example 1 as stated above, and in this experiment, a diesel engine was operated for 20 sec. or longer until the temperature of the exhaust gas immediately after emitted from the diesel engine became stable at about 200° C. At this time, the temperature of exhaust gas in the recirculation pipe immediately after being separated into the recirculation pipe also was also about at 200° C.

In this state, the temperature of exhaust gas in the exhaust pipe immediately after passing through the coupling position of the upstream side heat exchanger of the heat transfer part to the exhaust pipe was measured, and the result was 210° C. That is, in Example 1, the exhaust gas was heated to 210° C., and such heated exhaust gas received the injection of urea from the urea injection device and then flowed into the SCR catalyst converter.

Further in this state, the temperature of exhaust gas in the recirculation pipe immediately after passing through the coupling position of the high-temperature side heat exchanger of the acoustic-wave generator to the recirculation pipe was measured, and the result was 80° C. That is, in Example 1, the exhaust gas at 200° C. was cooled to 80° C., and then flowed back to the diesel engine.

In this state, the nitrogen oxide density in the exhaust gas finally emitted from the exhaust pipe via the SCR catalyst converter was measured. As a result, the nitrogen oxide density was about $20 \times 10^{-4}$ volume %, which was at a quite-well level. After the operation experiment as stated above, the inside of the exhaust pipe defining the exhaust path from the urea injection device to the SCR catalyst converter and the circumference of the SCR catalyst converter were examined, and no remaining urea in the form of liquid was found there.

Comparative Example 1

Comparative Example 1 was an exhaust system for diesel engine obtained by removing the transmission pipe, the acoustic-wave generator, and the heat transfer part that are the elements of the heating device from Example 1 as stated above.

Similarly to Example 1, the state in which the temperature of the exhaust gas immediately after emitted from the diesel engine became stable at about 200° C. was achieved using the exhaust system for diesel engine of Comparative Example 1. At this time, the temperature of exhaust gas in the recirculation pipe immediately after being separated into the recirculation pipe was also about at 200° C.

In this state, the temperature of exhaust gas in the exhaust pipe immediately before receiving the injection of urea from the urea injection device was measured, and the result was 120° C. That is, in Comparative Example 1, the exhaust gas at 120° C. received the injection of urea from the urea injection device, and then flowed into the SCR catalyst converter.

Further in this state, the temperature of exhaust gas in the recirculation pipe immediately before reaching the diesel engine was measured, and the result was about 200° C. That is, in Comparative Example 1, the exhaust gas at a temperature that was substantially the same as the temperature of the exhaust gas immediately after emitted from the diesel engine flowed back to the diesel engine.

In this state, the nitrogen oxide density in the exhaust gas finally emitted from the exhaust pipe via the SCR catalyst converter was measured. As a result, the nitrogen oxide density was high at about $400 \times 10^{-4}$ volume %, which was at a level such that exertion of the purification ability by the SCR catalyst converter was questioned. Actually, after the operation experiment as stated above, the inside of the exhaust pipe defining the exhaust path from the urea injection device to the SCR catalyst converter and the circumference of the SCR catalyst converter were examined, and urea in the form of liquid was left. This seems to be because in Comparative Example 1 urea injected by the urea injection device to the exhaust gas did not evaporate well because of low temperature of the exhaust gas, and so ammonia was not generated sufficiently through hydrolysis that was required to exert the purification ability by the SCR catalyst converter.

A comparison between the results of Example 1 and Comparative Example 1 as stated above shows that the heating device made up of the transmission pipe, the acoustic-wave generator, and the heat transfer part heated the exhaust gas to a sufficient temperature that can exert the purification ability by the SCR catalyst converter. The comparison further shows that, at the same time of the heating, the temperature of exhaust gas flowed back to the diesel engine through the recirculation pipe was sufficiently lowered.

Example 2

Example 2 is an example of the exhaust system 3000 of FIG. 6 in which the specific examples of FIGS. 2 to 4 as stated above for the acoustic-wave generator 100A and the heat transfer part 100B are used. The exhaust system of Example 2 is connected to a gasoline engine having displacement of 2 L, and the following describes Example 2 by way of specific numerical values.

For the exhaust pipe, a tubular metal pipe of 50 mm in diameter was used, and for the recirculation pipe, a tubular metal pipe of 25 mm in diameter was used. For the first three-way catalyst unit and the second three-way catalyst unit, a round pillar-shaped honeycomb structure of 120 mm in diameter was used, and three-way catalyst including platinum group elements was disposed on the inner wall faces of the cells of the honeycomb structure. For the heating device, the heating device including the transmission pipe, the acoustic-wave generator, and the heat transfer part as described in Example 1 was used. For the cooling pipe coupled to the low-temperature side heat exchanger of the acoustic-wave generator, a cooling pipe connected to a radiator through which water at about 40° C. for engine cooling flowed was used.

An operation experiment was conducted using the exhaust system for gasoline engine of Example 2 as stated above, and in this experiment, a gasoline engine was operated for 20 sec. or longer after the starting of the operation until the temperature of the exhaust gas immediately after emitted from the gasoline engine became stable at about 460° C. At this time, the temperature of exhaust gas in the recirculation pipe immediately after being separated into the recirculation pipe was also about at 460° C.

In this state, the temperature of exhaust gas in the exhaust pipe immediately after passing through the coupling position of the upstream side heat exchanger of the heat transfer part to the exhaust pipe was measured, and the result was 400° C. That is, in Example 2, the exhaust gas was heated to 400° C., and such heated exhaust gas flowed into the second three-way catalyst unit (herein the temperature of exhaust gas that was not heated was 220° C. as described below in Comparative Example 2).

Further in this state, the temperature of exhaust gas in the recirculation pipe immediately after passing through the coupling position of the high-temperature side heat exchanger of the acoustic-wave generator to the recirculation pipe was measured, and the result was 80° C. That is, in Example 2, the exhaust gas at about 460° C. was cooled to 80° C., and then flowed back to the gasoline engine.

In this state, the nitrogen oxide density in the exhaust gas finally emitted from the exhaust pipe via the second three-way catalyst unit was measured. As a result, the nitrogen oxide density was about $5 \times 10^{-4}$ volume %, which was at a quite-well level.

Comparative Example 2

Comparative Example 2 was the exhaust system for gasoline engine obtained by removing the transmission pipe, the acoustic-wave generator, and the heat transfer part that are the elements of the heating device from Example 2 as stated above.

An operation experiment was conducted using the exhaust system for gasoline engine of Comparative Example 2, and similarly to Example 2, the temperature of the exhaust gas immediately after emitted from the gasoline engine became stable at about 460° C. after 20 sec. or longer from the starting of the operation. At this time, the temperature of exhaust gas immediately after being separated into the recirculation pipe was also about at 460° C.

In this state, the temperature of exhaust gas in the exhaust pipe immediately after passing through the coupling position where the upstream side heat exchanger of the heat transfer part was coupled to the exhaust pipe was measured, and the result was 220° C. That is, in Comparative Example 2, the temperature of the exhaust gas was lowered to 220° C., and then such exhaust gas flowed into the second three-way catalyst unit.

Further in this state, the temperature of exhaust gas in the recirculation pipe immediately before reaching the gasoline engine was measured, and the result was about 460° C. That is, in Comparative Example 2, the exhaust gas at a temperature that was substantially the same as the temperature of the exhaust gas immediately after emitted from the gasoline engine flowed back to the gasoline engine.

In this state, the nitrogen oxide density in the exhaust gas finally emitted from the exhaust pipe via the second three-way catalyst unit was measured. As a result, the nitrogen oxide density was high at about $500 \times 10^{-4}$ volume %, which was at a level such that exertion of the purification ability by the second three-way catalyst unit was questioned.

A comparison between the results of Example 2 and Comparative Example 2 as stated above shows that the heating device made up of the transmission pipe, the acoustic-wave generator, and the heat transfer part heated the exhaust gas to a sufficient temperature that can exert the purification ability by the second three-way catalyst unit. The comparison further shows that, at the same time of the heating, the temperature of exhaust gas flowed back to the gasoline engine through the recirculation pipe was sufficiently lowered.

The present invention is effective to purify exhaust gas of a power unit while saving energy.

DESCRIPTION OF REFERENCE NUMERALS

1A: first heat/acoustic wave conversion component
1B: second heat/acoustic wave conversion component
11: partition wall
12: interference member
13: circumferential wall
14: cell
2A: high-temperature side heat exchanger
2B: upstream side heat exchanger
20: heat-exchanging honeycomb structure
21: partition wall
22: heat-exchanger casing
23: circumferential wall
24: cell
3A: low-temperature side heat exchanger
3B: downstream side heat exchanger
30: mesh lamination body
31: metal member
100: heating device
100A: acoustic-wave generator
100B: heat transfer part
100C: transmission pipe
101C: first part
102C: second part
1000: exhaust system
1001: power unit
1002: recirculation pipe
1003: valve
1004: exhaust pipe
1005: purification unit
1006: cooling pipe
2000: exhaust system
2001: diesel engine
2002: recirculation pipe
2003: valve
2004: exhaust pipe
2005: SCR catalyst converter
2006: cooling pipe
2007: DOC support
2008: DPF
2009: urea injection device
3000: exhaust system
3001: gasoline engine
3002: recirculation pipe
3003: valve
3004: exhaust pipe
3005: second three-way catalyst unit
3006: cooling pipe
3007: first three-way catalyst unit

What is claimed is:

1. An exhaust system connected to a power unit that burns fuel to generate power while generating exhaust gas, the exhaust system comprising:
    an exhaust pipe that is connected to the power unit and defines an exhaust path of exhaust gas generated by the power unit to atmosphere;
    a recirculation pipe that is connected to the exhaust pipe on the exhaust path and defines a recirculation path which separates a part of exhaust gas passing through the exhaust pipe and allows the part to flow back to the power unit as a part of intake gas for burning;
    a purification unit that is disposed on the exhaust path and purifies exhaust gas, which flows into the purification unit through the exhaust pipe without flowing into the recirculation pipe, by using catalyst whose exhaust-gas purification ability is activated by being heated; and
    a heating device that heats exhaust gas before flowing into the purification unit to heat the catalyst in the purification unit and activate exhaust-gas purification ability of the catalyst, wherein
    the heating device includes:
    an acoustic-wave generator that is coupled to the recirculation pipe and generates acoustic waves by absorbing heat from exhaust gas passing through the recirculation pipe flowing back and by giving the heat to working fluid, which oscillates to transmit acoustic waves, to cause the working fluid to oscillate,
    a transmission pipe that is connected to the acoustic-wave generator and transmits acoustic waves, which is generated by the acoustic-wave generator, by oscillation of the working fluid, and
    a heat transfer part that is connected to the transmission pipe and coupled to the exhaust pipe at both of an upstream position on the exhaust path upstream from the purification unit in the exhausting direction and at a downstream position downstream from the purification unit in the exhausting direction, the heat transfer part transferring heat of exhaust gas in the exhaust pipe passing through the downstream position to exhaust gas in the exhaust pipe passing through the upstream position by using acoustic waves transmitted by the transmission pipe.

2. The exhaust system according to claim 1,
    wherein the acoustic-wave generator includes:
    a first heat/acoustic wave conversion component that has a partition wall defining a plurality of cells which extend between two end faces of the first heat/acoustic wave conversion component and which are internally filled with working fluid oscillating to transmit acoustic waves, the first heat/acoustic wave conversion component mutually converting heat exchanged between the partition wall and the working fluid and acoustic-wave energy resulting from oscillations of the working fluid; and a high-temperature side heat exchanger that is coupled to the recirculation pipe and disposed close to one end face of the two end faces of the first heat/acoustic wave conversion component, the high-temperature side heat exchanger absorbing heat from exhaust gas flowing through the recirculation pipe and supply the heat to the one end face of the first heat/acoustic wave conversion component, and a low-temperature side heat exchanger that is disposed close to the other end face of the first heat/acoustic wave conversion component, the low-temperature side heat exchanger absorbing heat from the other end face of the first heat/acoustic wave conversion component and passing the heat to a predetermined cooling medium, wherein the transmission pipe has one end thereof connected to the low-temperature side heat exchanger and transmits acoustic waves, which is generated by the first heat/acoustic wave conversion component due to a temperature difference between the two end faces of the first heat/acoustic wave conversion component, from the one end of the transmission pipe to the other end of the transmission pipe, and wherein the heat transfer part includes:

a second heat/acoustic wave conversion component that has a partition wall defining a plurality of cells which extend between two end faces of the second heat/acoustic wave conversion component and which are internally filled with working fluid oscillating to transmit acoustic waves, the second heat/acoustic wave conversion component mutually converting heat exchanged between the partition wall and the working fluid and acoustic-wave energy resulting from oscillations of the working fluid;

a downstream side heat exchanger that is connected to the other end of the transmission pipe, that is disposed close to one end face of the two end faces of the second heat/acoustic wave conversion component, and that is coupled to the exhaust pipe at the downstream position from the purification unit, the downstream side heat exchanger absorbing heat from exhaust gas in the exhaust pipe passing through the downstream position and supplying the heat to the one end face of the second heat/acoustic wave conversion component; and an upstream side heat exchanger disposed close to the other end face of the second heat/acoustic wave conversion component and coupled to the exhaust pipe at the upstream position from the purification unit, the upstream side heat exchanger absorbing heat from the other end face of the second heat/acoustic wave conversion component and supplying the heat to exhaust gas in the exhaust pipe passing through the upstream position.

3. The exhaust system according to claim 2, wherein at least one of the first heat/acoustic wave conversion component and the second heat/acoustic wave conversion component includes a honeycomb structure made of cordierite.

4. The exhaust system according to claim 2, wherein
the power unit is a diesel engine that burns light oil to generate power while generating exhaust gas including nitrogen oxides,
the exhaust system further comprises a urea injection device that injects urea to exhaust gas before flowing into the purification unit,
the purification unit includes an SCR catalyst converter that reduces nitrogen oxides into water and nitrogen by using ammonia generated through hydrolysis of urea injected by the urea injection device and Selective Catalytic Reduction (SCR) catalyst, and
the upstream side heat exchanger supplies heat to exhaust gas at a position, as the upstream position, upstream in the exhausting direction from a position at which the urea injection device injects urea.

5. The exhaust system according to claim 3, wherein
the power unit is a diesel engine that burns light oil to generate power while generating exhaust gas including nitrogen oxides,
the exhaust system further comprises a urea injection device that injects urea to exhaust gas before flowing into the purification unit,
the purification unit includes an SCR catalyst converter that reduces nitrogen oxides into water and nitrogen by using ammonia generated through hydrolysis of urea injected by the urea injection device and Selective Catalytic Reduction (SCR) catalyst, and
the upstream side heat exchanger supplies heat to exhaust gas at a position, as the upstream position, upstream in the exhausting direction from a position at which the urea injection device injects urea.

6. The exhaust system according to claim 2, wherein
the power unit is a gasoline engine that burns gasoline to generate power while generating exhaust gas including nitrogen oxides, hydrocarbons and carbon monoxide, and
the purification unit includes a three-way catalyst unit that removes nitrogen oxides, hydrocarbons and carbon monoxide by three-way catalyst.

7. The exhaust system according to claim 3, wherein
the power unit is a gasoline engine that burns gasoline to generate power while generating exhaust gas including nitrogen oxides, hydrocarbons and carbon monoxide, and
the purification unit includes a three-way catalyst unit that removes nitrogen oxides, hydrocarbons and carbon monoxide by three-way catalyst.

8. The exhaust system according to claim 1, wherein
the transmission pipe includes a first pipe that transmits acoustic waves generated at the acoustic-wave generator to the heat transfer part as well as a second part that transmits acoustic waves which has passed through the heat transfer part to the acoustic-wave generator.

9. The exhaust system according to claim 5, wherein
the transmission pipe includes a first pipe that transmits acoustic waves generated at the acoustic-wave generator to the heat transfer part as well as a second part that transmits acoustic waves which has passed through the heat transfer part to the acoustic-wave generator.

10. The exhaust system according to claim 7, wherein
the transmission pipe includes a first pipe that transmits acoustic waves generated at the acoustic-wave generator to the heat transfer part as well as a second part that transmits acoustic waves which has passed through the heat transfer part to the acoustic-wave generator.

* * * * *